US011485026B2

(12) United States Patent
Roberts et al.

(10) Patent No.: US 11,485,026 B2
(45) Date of Patent: Nov. 1, 2022

(54) CONSTRUCTION AUTOMATION SYSTEM AND METHOD

(71) Applicant: Spherical Block LLC, Alfred Station, NY (US)

(72) Inventors: Peter Andrew Roberts, Alfred Station, NY (US); Nolan Kramer, Holland, NY (US); Sara Perez, New York, NY (US); Jared Mason, Jamaica, NY (US); Naqib Shahan, Jamaica, NY (US); Nicholas Risley, Brocton, NY (US); Eric Chindamo, Auburn, NY (US); Patrick Palmer, Alfred Station, NY (US)

(73) Assignee: Spherical Block LLC, Alfred Station, NY (US)

( * ) Notice: Subject to any disclaimer, the term of this patent is extended or adjusted under 35 U.S.C. 154(b) by 128 days.

(21) Appl. No.: 16/950,016

(22) Filed: Nov. 17, 2020

(65) Prior Publication Data
US 2021/0069913 A1  Mar. 11, 2021

Related U.S. Application Data

(63) Continuation-in-part of application No. 16/405,528, filed on May 7, 2019, now Pat. No. 10,870,979.

(51) Int. Cl.
*B25J 15/00* (2006.01)
(52) U.S. Cl.
CPC ........ *B25J 15/0023* (2013.01); *B25J 15/0047* (2013.01)

(58) Field of Classification Search
CPC .......................... B25J 15/0023; B25J 15/0047
See application file for complete search history.

(56) References Cited

U.S. PATENT DOCUMENTS

| 4,168,073 | A | * | 9/1979 | LaRue | ..................... | F24S 10/45 |
| | | | | | | 294/93 |
| 4,173,368 | A | * | 11/1979 | Haverbusch | .............. | B66C 1/46 |
| | | | | | | 294/93 |
| 4,770,456 | A | * | 9/1988 | Phillips | ..................... | B25J 15/00 |
| | | | | | | 294/93 |

(Continued)

FOREIGN PATENT DOCUMENTS

| EP | 2995564 A1 * | 3/2016 | .......... B25J 15/0023 |
| WO | WO-2017138883 A1 * | 8/2017 | |

*Primary Examiner* — Saul Rodriguez
*Assistant Examiner* — Brendan P Tighe
(74) *Attorney, Agent, or Firm* — Tracy Jong Law Firm; Tracy P. Jong; Cheng Ning Jong

(57) ABSTRACT

A manipulator configured for transferring a block having a core, the manipulator includes an end effector including an elongated member including a tip; and a resilient member configured for assuming a first state in which the resilient member has a first hardness and first size and a second state in which the resilient member is configured for assuming a second state in which the resilient member has a second hardness and second size, the resilient member is disposed on the tip, wherein the elongated member is configured to be disposed such that the tip is disposed within the core and the resilient member is disposed in the first state before the resilient member is disposed in the second state to engage the core and the elongated member is moved to transfer the block.

6 Claims, 24 Drawing Sheets

(56) References Cited

U.S. PATENT DOCUMENTS

| | | | |
|---|---|---|---|
| 7,475,927 B2* | 1/2009 | Maffeis | B25J 15/0047 294/93 |
| 2013/0127195 A1* | 5/2013 | Goudy | B25J 15/0047 294/199 |

* cited by examiner

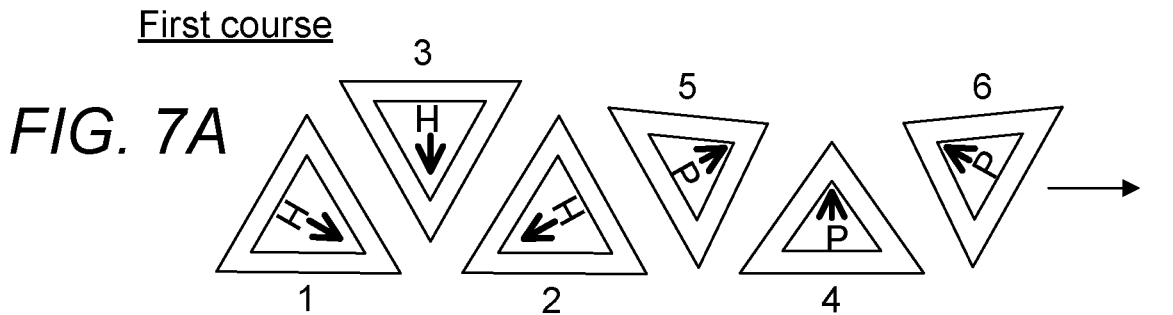
FIG. 7A First course
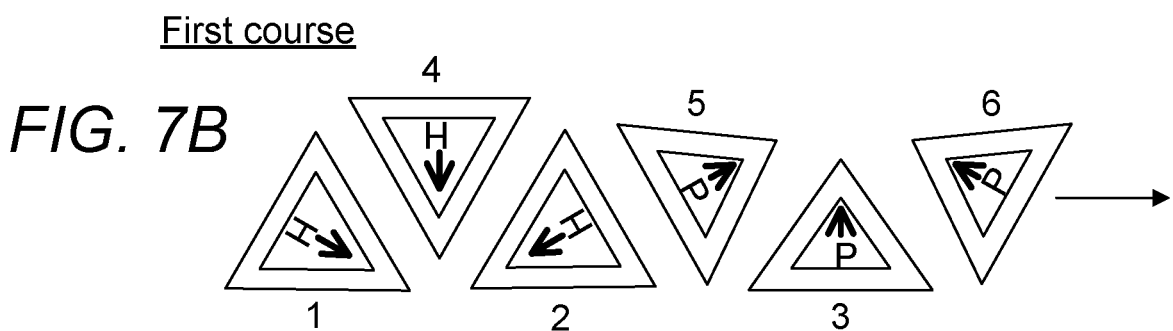
FIG. 7B First course
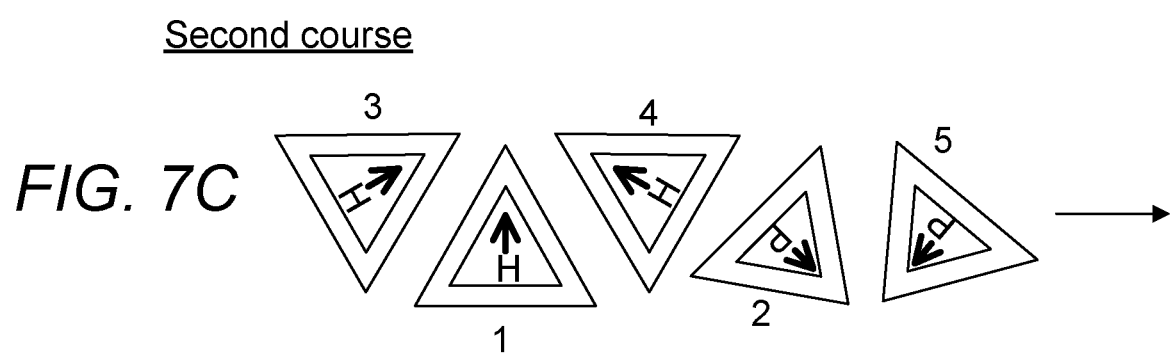
FIG. 7C Second course
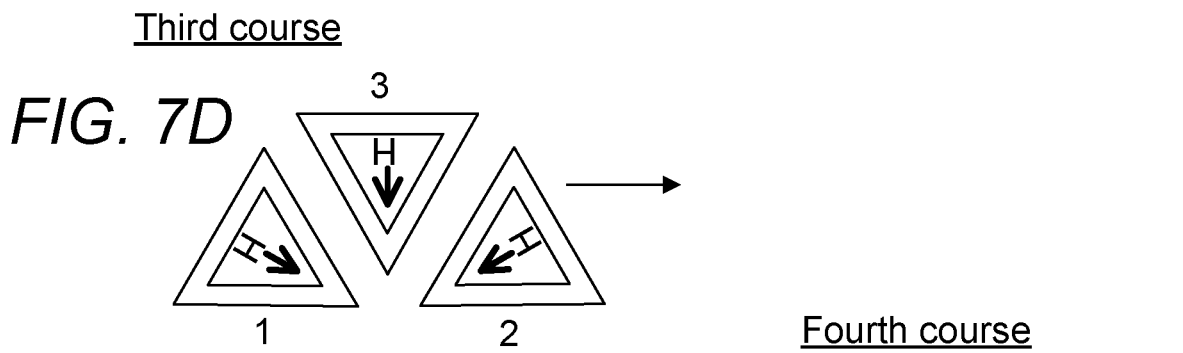
FIG. 7D Third course
FIG. 7E Fourth course Fifth course Sixth course Seventh course Eighth course

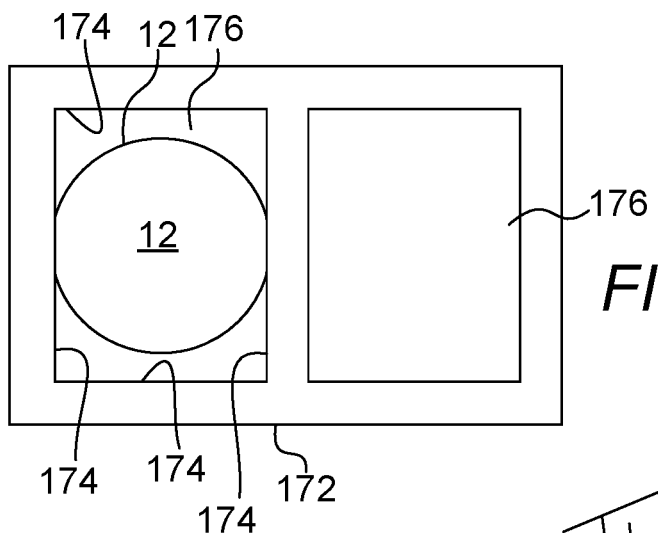
*FIG. 10B*
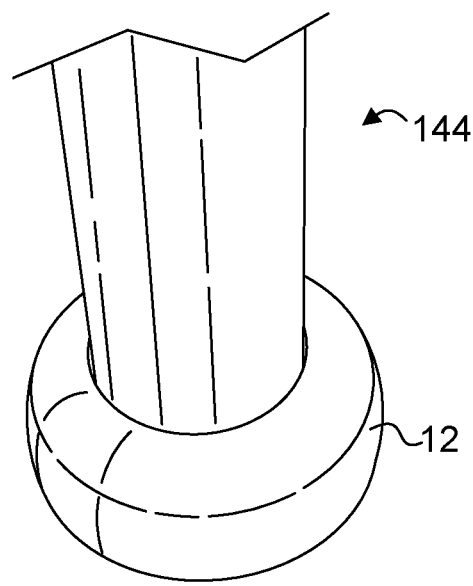
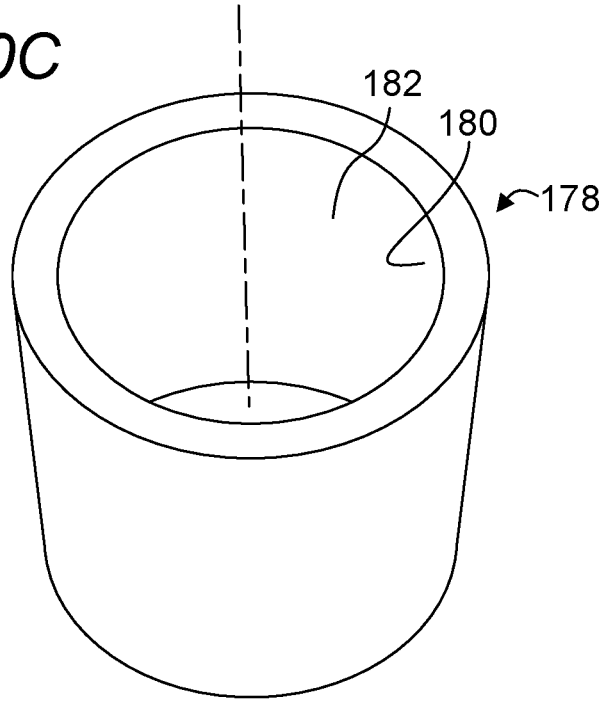
*FIG. 10C*

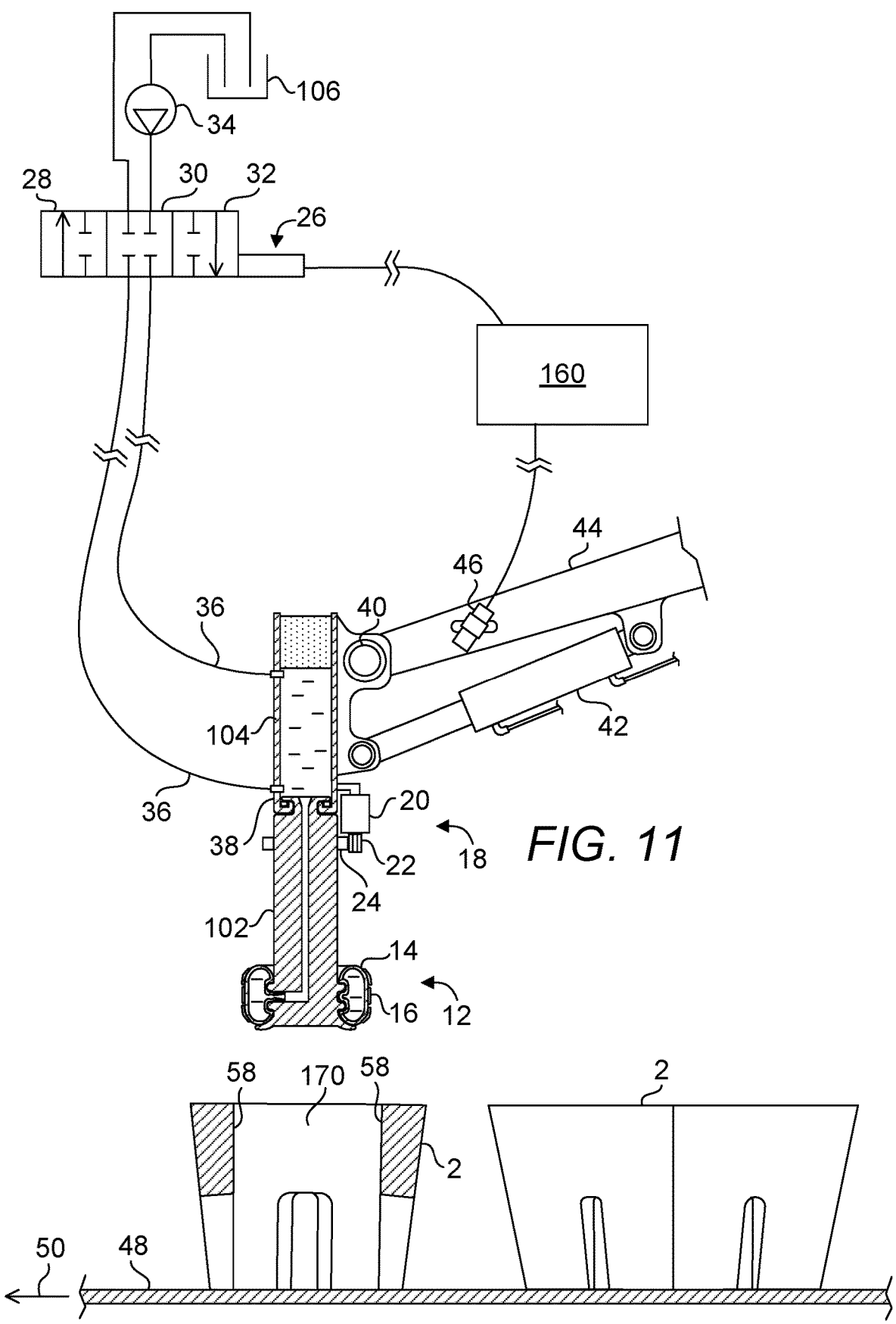

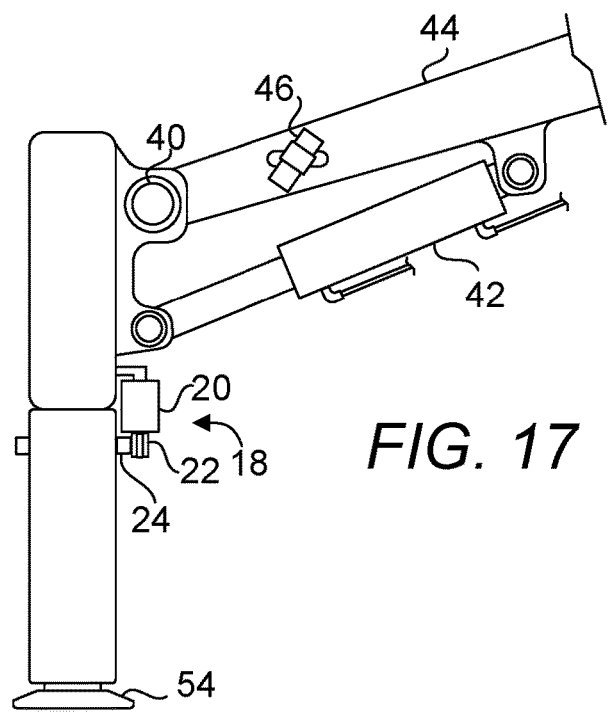
FIG. 17
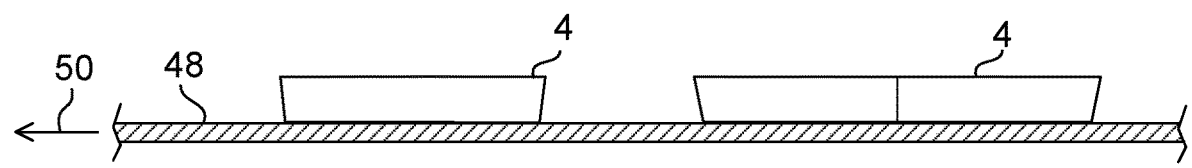
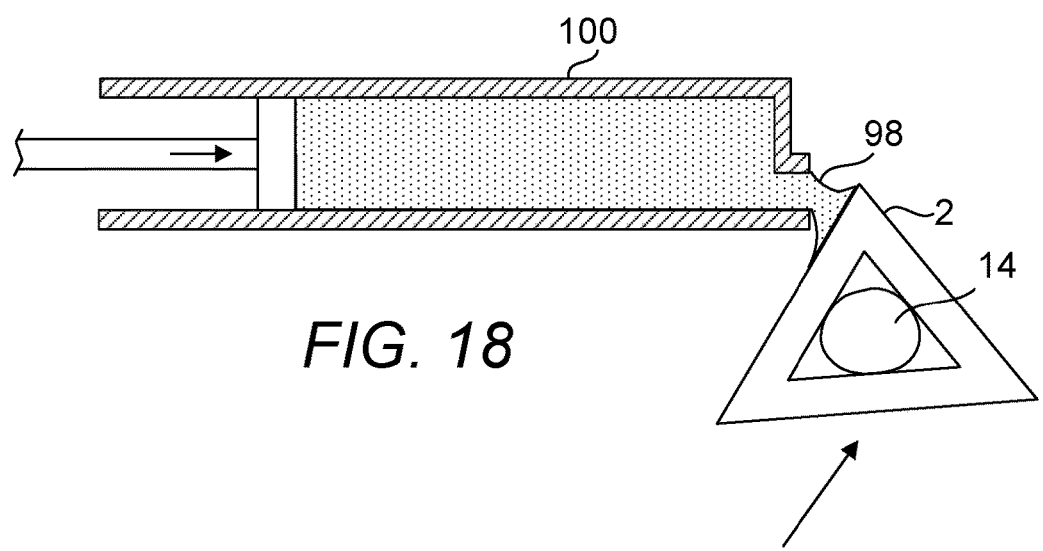
FIG. 18

CONSTRUCTION AUTOMATION SYSTEM AND METHOD

PRIORITY CLAIM AND RELATED APPLICATIONS

This continuation-in-part application claims the benefit of priority from non-provisional application U.S. Ser. No. 16/405,528 filed on May 7, 2019. Said application is incorporated by reference in its entirety.

BACKGROUND OF THE INVENTION

1. The Field of the Invention

The present invention is directed generally to apparatuses and methods for constructing spheres, partial spheres, domes and arches. More specifically, the present invention is directed to apparatuses and methods for automated and semi-automated construction of spheres, partial spheres, domes and arches using blocks and panels.

2. Background Art

In fabricating structures composed of curvilinear parts, typically forms are required for concrete pouring as conventional blocks are often unsuitable for constructing such parts as conventional masonry blocks are unsuitable due to their shapes and sizes. On-site constructions of structures using forms often involve significant custom architectural and engineering preparation work, which not only increases the construction cost but also the lead time in completing the construction projects. Even if conventional masonry blocks are used to construct curvilinear parts, sufficient skills are required to custom shape some masonry blocks so that they can fit in with other unmodified blocks to approximate the structural shape to be constructed. Conventional blocks used for curvilinear parts include rectangular and triangular blocks, etc. In many occasions, sufficient skills may also be required to adjust the amount of mortar used or the configuration of the gasket between blocks such that curvilinear parts can be constructed. When built without forms or other supporting structures, the use of conventional blocks does not yield uniform, accurate and repeatable curvilinear parts, e.g., cylinders and arches, let alone spheres, partial spheres, domes and arches. It may even be impossible to construct a curvilinear structure using conventional blocks if mortar or gasket had not been used. If equilateral triangular blocks are used, a structure having flat planar surfaces may be formed. However, this is a far cry from a three-dimensional curved structure made of pentagonal and hexagonal blocks such as those disclosed in U.S. Pat. No. 10,036,161 to Roberts et al. (Hereinafter Roberts 1) and U.S. patent application Ser. No. 16/292,903 to Roberts et al. (Hereinafter Roberts 2) where surface features are related to arc lengths rather than chord length as structures built from such blocks can better approximate those of true spheres or partial spheres rather than geodesic structures.

Further, the labor and time involved in erecting a building or parts of a building with blocks and panels can be tremendous and may be primary reasons for builders to select other modes of construction, e.g., prefabrication of building modules offsite and other materials less thermally and environmentally favorable and suitable for the building to be constructed. Yet further, certain construction materials may require skilled labor force not already available at a construction locale and must be imported. Assisted and automated construction of buildings using rectangular blocks and bricks for building structures having flat walls have been previously attempted to various degrees of success. Assisted and automated construction of buildings using three-dimensional (3D) printing techniques have also been previously attempted. Assisted and automated construction of buildings using uniform rectangular bricks or blocks have also been previously attempted. However, no previous attempts have been made to fully or partially construct a building or parts of a building using techniques of automation involving blocks and panels capable to be used to form curved structures.

Roberts 1 and Roberts 2 each discloses an architectural building block system including a block having three side walls, each having an inside surface and an outside surface, the three side walls cooperate to form a triangular tube having three corners, the outside surface of each of the three side walls extending outwardly from the inner surface to the outer surface and the inside surface of each of the three walls is disposed substantially at right angle to each of the inner surface and the outer surface. Roberts 2 also includes three channels, each channel disposed on one of the three side walls on the inner surface, wherein each channel extending from the inside surface to the outside surface of one of the three side walls and each pair of the three channels configured to receive a rebar. At least one of the side walls is configured to be positionable so as to mate with a side wall of an adjacently disposed block to form two aligned channels to receive the rebar, whereby curved structures may be constructed from a plurality of such blocks to form a dihedral angle between each set of two blocks. Both Roberts 1 and 2 disclose blocks suitable for constructing spheres and partial spheres. Further, blocks and panels similar to those disclosed in Roberts 1 and 2 but otherwise having no channels, may also be suitable for use in construction of spheres and partial spheres provided that proper supports are provided while the structures are being constructed from such blocks.

Thus, there is a need for apparatuses and methods useful for automatically or semi-automatically constructing spheres, partial spheres, domes and arches using blocks or panels suitable for use in forming such structures to reduce labor costs, accessories required for constructing such structures, e.g., scaffolds or other aids and the time it takes to complete such structures. Spheres, partial spheres, domes and arches are capable of resisting environmental forces and they can be built without using pre-fabricated or in-situ built forms and temporary support structures or scaffolding systems and some blocks used for constructing these structures can be coupled or used in conjunction with long continuous rebars which have been pre-deployed.

SUMMARY OF THE INVENTION

In accordance with the present invention, there is provided a manipulator configured for transferring a block having a core, the manipulator includes:
  an end effector including:
  (i) an elongated member including a tip; and
  (ii) a resilient member configured for assuming a first state in which the resilient member has a first hardness and first size and a second state in which the resilient member is configured for assuming a second state in which the resilient member has a second hardness and second size, wherein the first hardness is not the same as the second hardness and the first size is not the same as the second size and the resilient member is disposed on the tip, wherein the elongated member is configured to be disposed such that the tip is disposed within the core and the resilient member is disposed in the first state before the resilient member is disposed in the second state to engage the core and the elongated member is moved to transfer the block.

In one embodiment, the resilient member includes a bladder. In one embodiment, the bladder includes treads disposed on an outside surface of the bladder to enhance engagement of the resilient member of the core. In one embodiment, the resilient member includes leaf springs. In one embodiment, the manipulator further includes a second member, wherein the elongated member further includes a second end opposingly disposed from the tip on the elongated member, the elongated member is rotatably connected to the second member such that the orientation of the block engaged by the end effector can be adjusted. In one embodiment, the end effector is controlled by a hydraulic system or a pneumatic system. In one embodiment, the end effector is controlled by a system including a three-position valve. In one embodiment, the block is supplied by a material supply system that is not physically connected to the manipulator. In one embodiment, the block is a triangular block. In another embodiment, the block is a rectangular block. In yet another embodiment, the block is a cylindrical block.

An object of the present invention is to provide apparatuses and methods for constructing a building using certain blocks or panels capable of assembly with similar blocks or panels to form spheres, partial spheres, domes and arches, e.g., flying buttresses, etc.

An object of the present invention is to provide apparatuses and methods for automatically or semi-automatically constructing a building using certain blocks or panels capable of assembly with similar blocks or panels to form spheres, partial spheres, domes and arches.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 7A-7E depict arrangements of blocks in various courses of blocks used for constructing the dome of FIG. 7.

FIG. 10B is a diagram depicting a manner in which a rectangular block may be picked up.

FIG. 10C is a diagram depicting a manipulator including an end effector configured for installing a block with other similar blocks to form, e.g., a post.

FIGS. 11-14 represent a series of diagrams depicting one embodiment of a control system useful for controlling an end effector for moving blocks in the process of installing such blocks to form a sphere, partial sphere, dome or arch.

FIG. 17 is a diagram depicting one embodiment of an end effector useful for moving panels in the process of installing such panels to form a sphere, partial sphere, dome or arch.

FIG. 18 is a diagram depicting a manner in which mortar is applied to a block.

PARTS LIST

Figure 1:
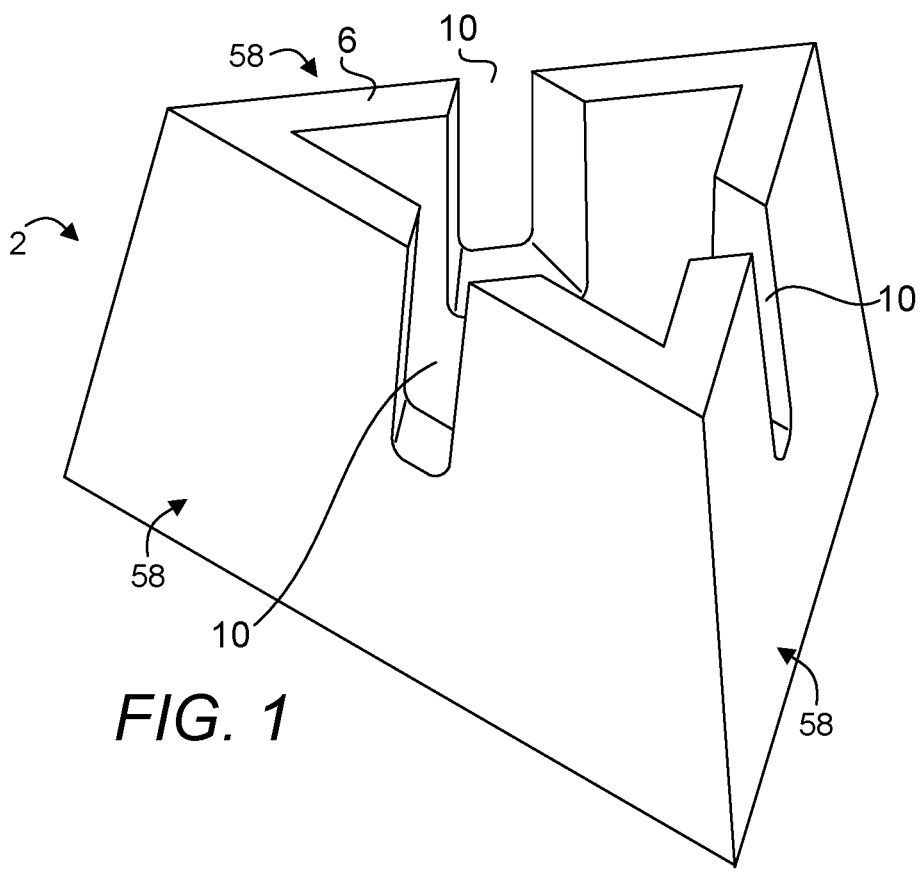
FIG. 1 is a bottom perspective view of a block suitable for use in the construction of a sphere or spherical dome.

2—pentagonal or hexagonal block
4—panel
6—inner surface
8—outer surface
10—channel
12—end effector
14—bladder
16—tread
18—rotation mechanism
20—motor
22—pinion
24—rack 26—directional control valve
28—first position
30—second position
32—third position
34—pump
36—fluid conductor
38—rotational joint
40—joint
42—actuator
44—arm
46—sensor, camera or imaging system
48—conveyor
50—direction in which conveyor travels
54—suction cup
56—wall
58—side wall
60—base upon which first course of blocks are disposed
62—rebar
64—group of first course of first frequency truncated icosahedron
66—group of second course of first frequency truncated icosahedron
68—group of third course of first frequency truncated icosahedron
70—group of fourth course of first frequency truncated icosahedron
72—group of first course of second frequency truncated icosahedron
74—group of second course of second frequency truncated icosahedron
76—group of third course of second frequency truncated icosahedron
78—group of fourth course of second frequency truncated icosahedron
80—group of fifth course of second frequency truncated icosahedron
82—group of sixth course of second frequency truncated icosahedron
84—group of seventh course of second frequency truncated icosahedron
86—group of eighth course of second frequency truncated icosahedron
88—dimensional center of block
90—radial distance of the dimensional center of block from center of partial sphere or sphere
92—center of partial sphere or sphere
94—polar angle
96—azimuth angle
98—mortar
100— dispenser
102—cylinder
104—cylinder
106—tank
108—leaf spring
110—upper ring
112—lower ring
114—string
116—drive pulley
118—pulley
120—motor
122—central axis
124—rotation
126—construction robot
128—base
130—trunk
132—rotation of trunk
134—extension/contraction of trunk
136—arm
138—rotation of arm 136
140—arm
142—rotation of arm 140
144—manipulator
146—rotation of arm 44
148—roof
150—drive roller
152—idler roller
154—cradle
156—radio frequency identification (RFID) component
158—RFID component
160—controller
162—outline
164—outline
166—outline
168—outline
170—core
172—rectangular block
174—side wall
176—core
178—cylindrical block
180—side wall
182—core

PARTICULAR ADVANTAGES OF THE INVENTION

A method is provided for laying a plurality of blocks or panels to form a polyhedron. Prior methods are strictly related to laying rectangular blocks to form straight walls and therefore no prior methods are capable of aiding one in laying triangular-shaped blocks to form a polyhedron. The present method makes a distinction in the type of block used and the orientation of the block when laying the block.

In laying a block, the block is not picked up at one edge, simplifying the trajectory calculations required in getting the block to its target. By disposing an end effector within the core of a block, the end effector is essentially disposed centrally with respect to the block. Therefore, no translational adjustment is necessary due to an adjustment in the orientation of the block. An end effector configured for holding a block at its core is a simpler design than one configured for holding the block by one of its side walls. Further, if a block is held by one of its side walls, the side wall that is available for use for this purpose must be determined and this additional complexity adds to the calculations that need to be made for the end effector to grasp the block by an appropriate side wall and increases the potential for errors to occur in grasping the block.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
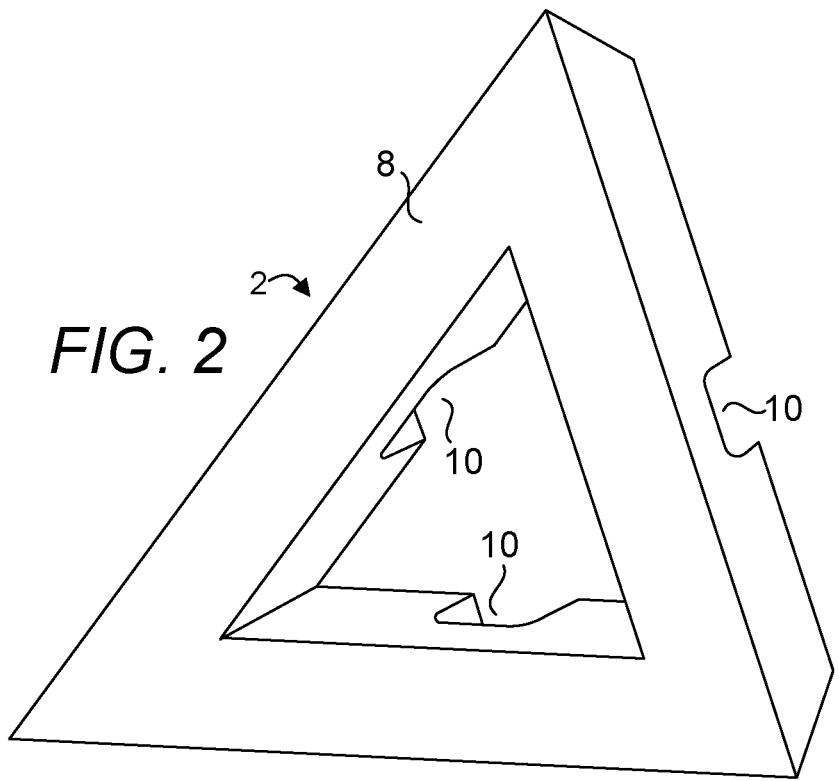
FIG. 2 is a top perspective view of the block of FIG. 1.
Figure 3:
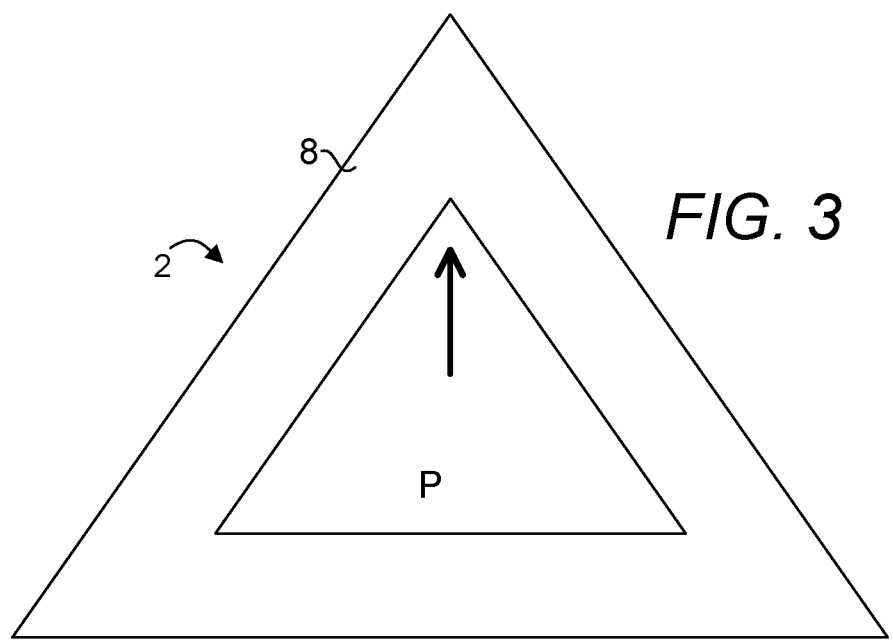
FIG. 3 is a top view of the block of FIG. 2.
Figure 4:
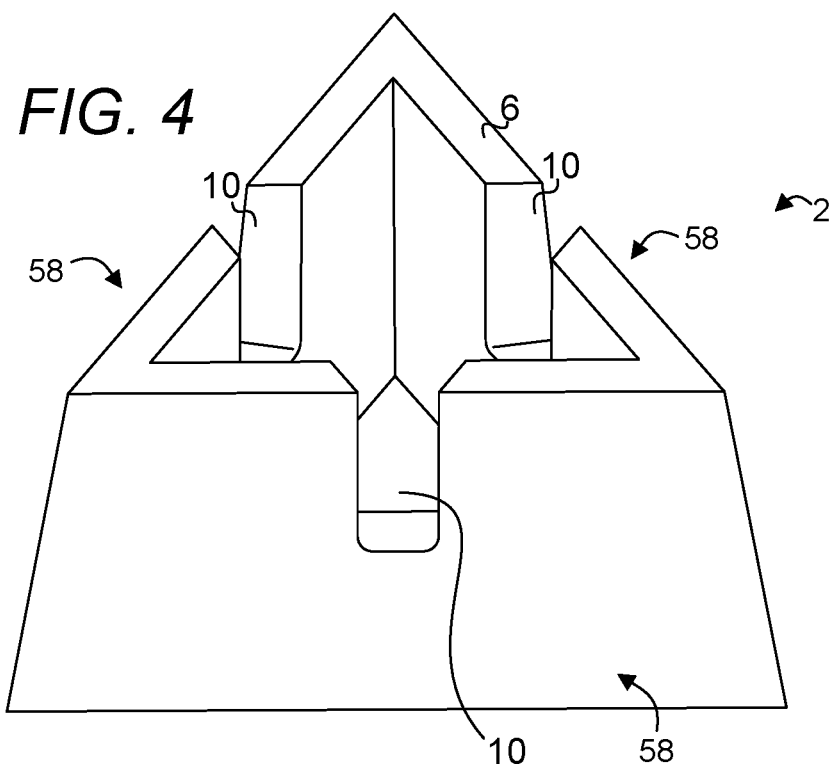
FIG. 4 is a bottom perspective view of a block suitable for use in the construction of a sphere or spherical dome.
Figure 5:
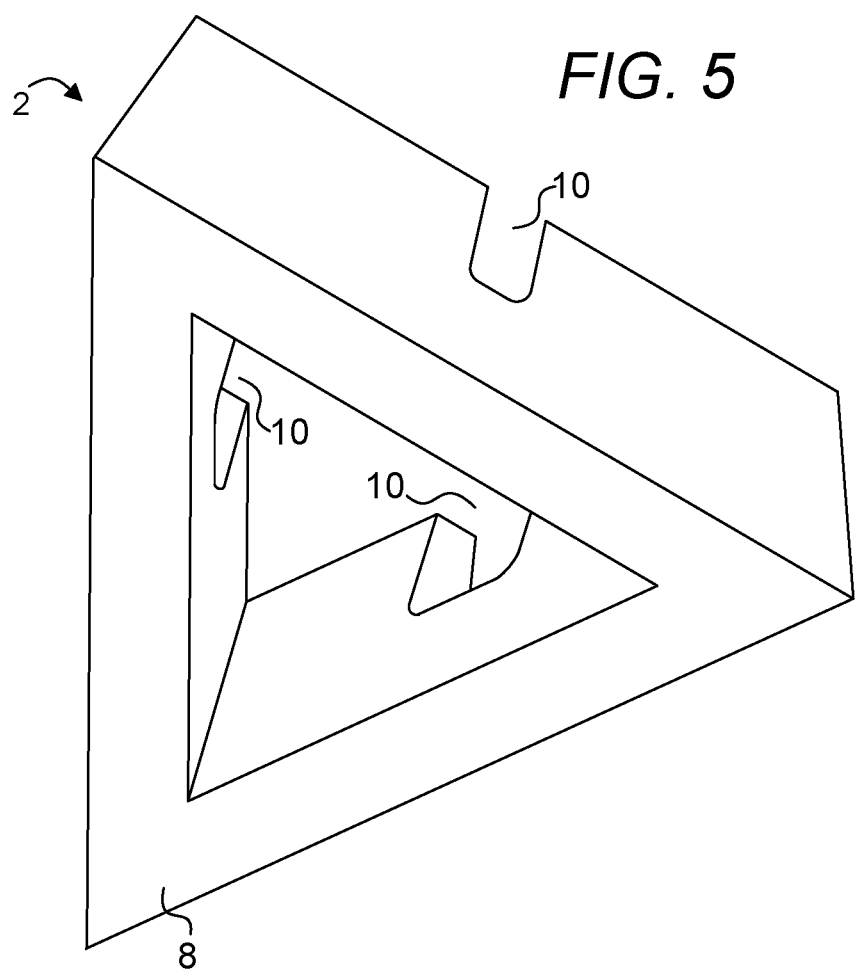
FIG. 5 is a top perspective view of the block of FIG. 4.
Figure 6:
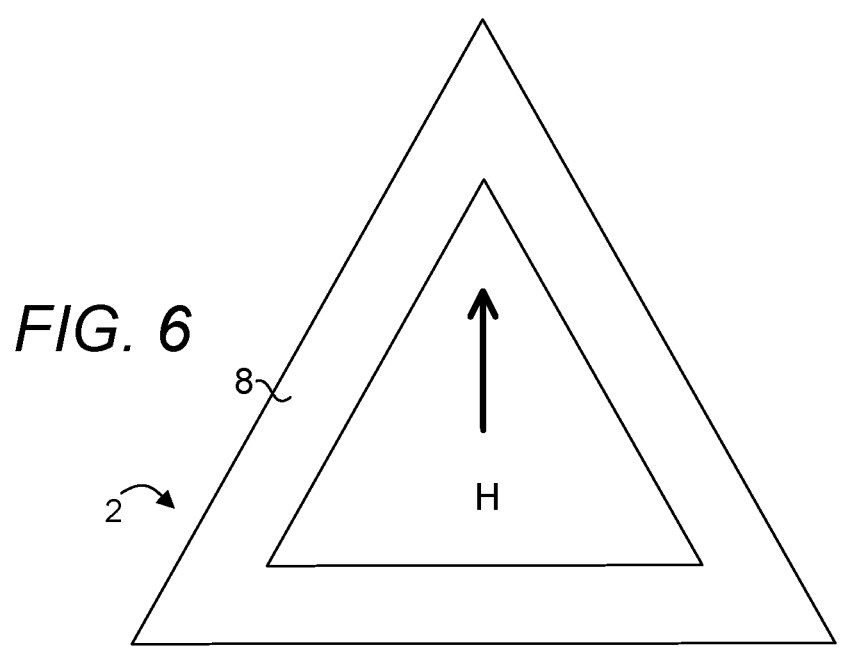
FIG. 6 is a top view of the block of FIG. 5.

FIG. 1 is a bottom perspective view of a block 2 suitable for use in the construction of a sphere or spherical dome as disclosed in Roberts 2 as a pentagonal block. FIG. 2 is a top perspective view of the block of FIG. 1. FIG. 3 is a top view of the block of FIG. 2. The block 2 shown in FIGS. 1-3 is a generally triangular block having an outer surface 8, an inner surface 6 disposed in substantially parallel configuration with respect to the outer surface 8 and three side walls, each adjoining the outer surface 8 and the inner surface 6. FIG. 4 is a bottom perspective view of a block suitable for use in the construction of a sphere or spherical dome as disclosed in Roberts 2 as a hexagonal block. FIG. 5 is a top perspective view of the block of FIG. 4. FIG. 6 is a top view of the block of FIG. 5. Again, the block 2 shown in FIGS. 4-6 is a generally triangular block having an outer surface 8, an inner surface 6 disposed in substantially parallel configuration with respect to the outer surface 8 and three side walls, each adjoining the outer surface 8 and the inner surface 6. Each block 2 shown in FIGS. 1-6 includes a channel 10 disposed on each of the three side walls 58 on the inner surface 6, wherein each channel 10 extending from the inside surface to the outside surface of one of the three side walls and each pair of the three channels are configured to receive a rebar. A side wall is configured to be positionable so as to mate with a side wall of an adjacently disposed block 2 to form two aligned channels as shown in FIGS. 34-37 of Roberts 2 such that curved structures may be constructed from a plurality of such blocks to form a dihedral angle between each set of two blocks as shown in FIGS. 24-27 of Roberts 2. Blocks disclosed in Roberts 1 have the same general shape as those of Roberts 2 with the exception that the channels of blocks of Roberts 1 being disposed differently from those of Roberts 2. However, in general, the blocks of Roberts 1 can be laid according to courses similar to those of blocks of Roberts 2. Further, blocks without channels shown in Roberts 1 and Roberts 2 may also be laid according to courses similar to those of blocks of Roberts 1 and Roberts 2, provided that sufficient support of the blocks is available while the blocks are laid.

It shall be apparent, after viewing the ensuing figures that, the process in which the blocks suitable for forming a dome or partial dome, such as those disclosed in Roberts 1 and Roberts 2, involves more than simply picking a rectangular block identical to all of the blocks used by a ledge or sides and stacking or laying the block on top of a base or blocks previously laid in the direction of stacking the blocks. In contrast, disclosed herein are apparatuses and methods useful for constructing spheres, partial spheres, domes and arches, e.g., flying buttresses, etc., or any structures involving curved surfaces. FIGS. 7-9A depict truncated icosahedrons and the courses that constitute these structures. Other polyhedra, e.g., icosahedron, dodecahedron, etc., may be constructed by following the techniques disclosed elsewhere herein.

Figure 7:
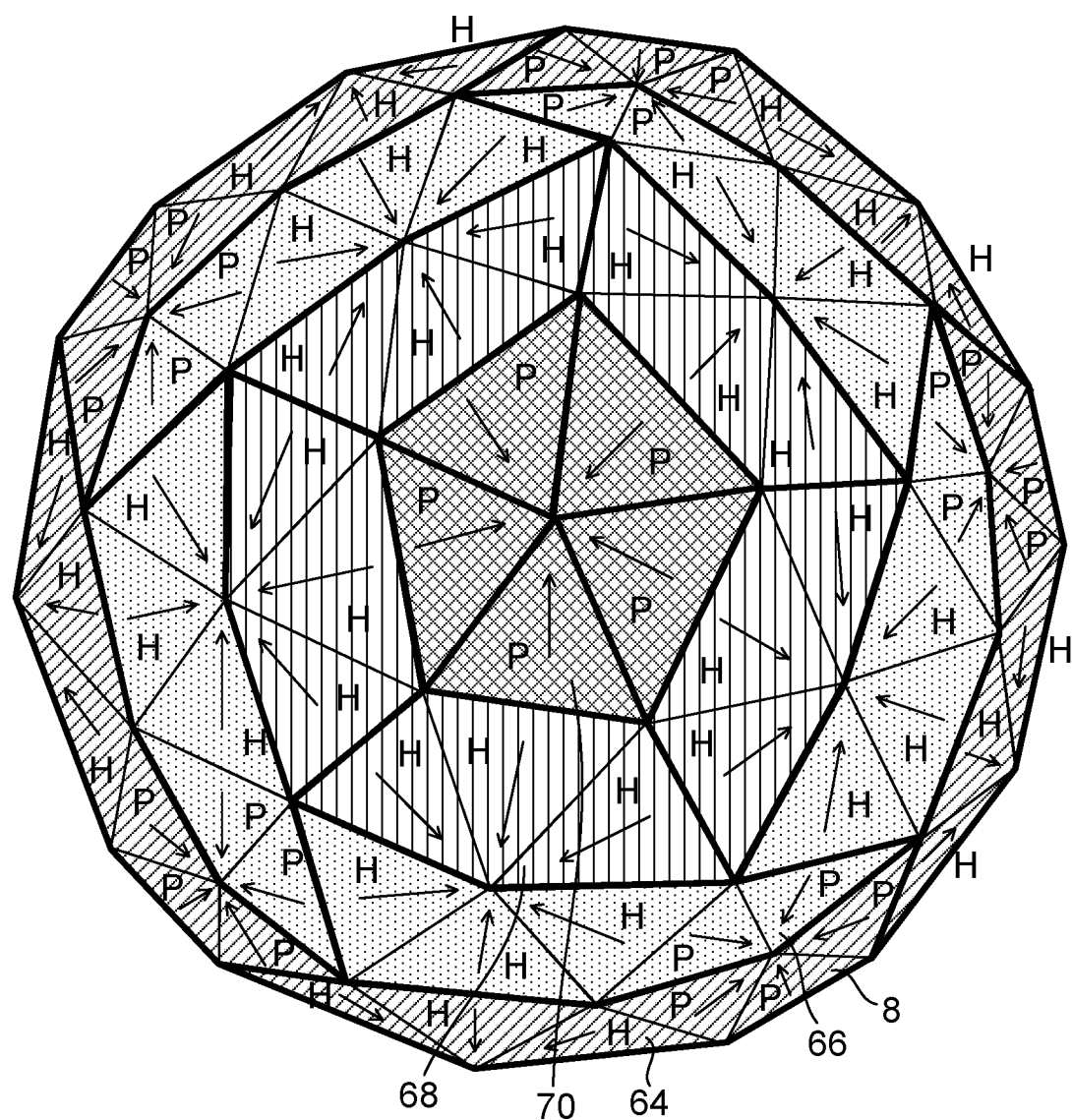
FIG. 7 depicts a first frequency dome constructed with pentagonal and hexagonal blocks.

FIG. 7 depicts a first frequency ⅜ polyhedron or more specifically a truncated icosahedron constructed with pentagonal and hexagonal blocks. FIGS. 7A-7E depict arrangements of blocks in various courses of blocks used for constructing the dome of FIG. 7. It shall be noted that there is a total of four courses from the periphery of the structure to the center of the structure. There are thirty blocks and five blocks making up the first course and the last or fourth course of the structure, respectively. The blocks are depicted without cores as in those shown in FIGS. 1-6 for simplicity. For ease of reference to the orientation of a block, an arrow is drawn over the block to represent the direction in which the block points with the arrow pointing from the down position to the up position towards a tip of the block. Note that the blocks of Roberts 1 and Roberts 2 are blocks formed in the shape of isosceles triangles which upon assembly, form a more accurately curved structure. The arrow of a block points at the corner of the side walls with equal lengths. Contrast these blocks to equilateral triangular blocks which would result in a flat planar surface if assembled, rather than a three-dimensional curved surface as in the case of the blocks of Roberts 1 and Roberts 2. When assembled with the blocks of Roberts 1 and Roberts 2, a structure that is formed has surfaces having features related to arc lengths rather than chord lengths as in the case of equilateral triangular blocks. A letter "P" is used indicate that a block is a pentagonal block and an "H" or "h" is used to indicate that a block is a hexagonal block. A truncated icosahedron, like most polyhedral, has a 5-fold axis of symmetry, i.e., the pattern of block type and orientation is repeated a total of five times in order to complete a course. In FIG. 7, a prominent boundary is drawn to show a unique group of blocks within each course. In other words, to form a truncated icosahedron of the first frequency, there is a total of five groups of blocks of a unique pattern for each course. FIGS. 7A-7E each depicts the order and orientation in which the indicated blocks are used to form a group of a block. For instance, FIG. 7A or 7B, 7C, 7D illustrates a first course group, second course group, third course group and fourth course group, respectively. Each of FIGS. 7A and 7B shows a first course group. These two figures are shown to illustrate that there can be more than one order for laying the blocks. The numbers used in each group in FIGS. 7A-7E, 8A-8H and 9A show the order in which the block is laid in its respective group and the arrow shows the general direction in which the blocks are laid. Note that the blocks in FIGS. 7A-7E, 8A-8H and 9A are shown as if they are disposed on a flat surface. However, each block shall be laid with the center point of the structure to be constructed disposed in such a manner that the radius of the structure to be constructed is normal to a surface upon which the outer surface 8 of the block is disposed. The orientation of a block just prior to it being laid can be represented in the following manner: right-up, right-down, left-up, left-down, up and down. For instance, block "1" of FIG. 7A is a block disposed in a right-down orientation. Block "5" of FIG. 7A is a block disposed in a right-up orientation. Block "5" of FIG. 7A is a block disposed in a right-up orientation. Block "2" of FIG. 7D is a block disposed in a left-down orientation. Block "6" of FIG. 7A is a block disposed in a left-up orientation. Block "4" of FIG. 7A is a block disposed in an up orientation. Block "3" of FIG. 7A is a block disposed in a down orientation. Referring back to FIG. 7A, a block orientated in the right-down orientation (block "1") is first laid followed by a block orientated in the left-down orientation (block "2") disposed adjacent it. Here block "3" is a block disposed in the down orientation and is orientated to be laid between two flanking blocks previously laid. Note in FIG. 7B that block "3" can alternatively be a block that is disposed adjacent block "2" but not adjacent block "1." In other words, in FIG. 7B, as much area is covered first as block "3" is laid to the right of block "2." In FIG. 7A, a portion of the course is "perfected" as much as possible before more blocks are laid to the right. It shall be noted that although the group shown in FIGS. 7A and 7B is shown as a group, the group of blocks do not need to be completed before blocks of another group of the same course or blocks of another course can be laid. For instance, referring back to FIG. 7A, block "6" of the current group should not be laid block "1" of the next group has been laid to the right of the current group. Referring to FIGS. 7, 7A and 7C, in locating the second course with respect the first course, it shall be noted that the right corner of block "3" of the second course meets with the right corner of block "1" of the first course once these blocks have been laid. In locating the third course with respect to the second course, it shall be noted that the tip of block "1" of the third course meets with the tip of block "3" of the second course. Finally, in locating the fourth course with respect to the third course, it shall be noted that the left corner and right corner of block "1" of the fourth course meet with the right corner and left corner of block "3" of the third course, respectively. Note, in some of the courses, a mixture of pentagonal blocks (those labelled "P") and hexagonal blocks (those labelled "H") are used while in other courses, only pentagonal or hexagonal blocks are used. Note that in order to complete a course, a unique group for the course must be completed a total of five times. Each course may be completed before the next course is started. Alternatively, a group of blocks of a prior course is laid before a group of blocks of a current course is laid on top of the blocks of the prior course. A first frequency truncated icosahedron constructed from the blocks according to Roberts 1 and Roberts 2 spans from about 7 to about 8 ft. In the embodiment shown in FIG. 7, a dome that is constructed in this shape can used as a roof of a structure. In another embodiment, a structure of this shape can be a bottom part of a sphere. If used as a bottom part of a sphere, block laying will start at the fourth course.

Figure 8:
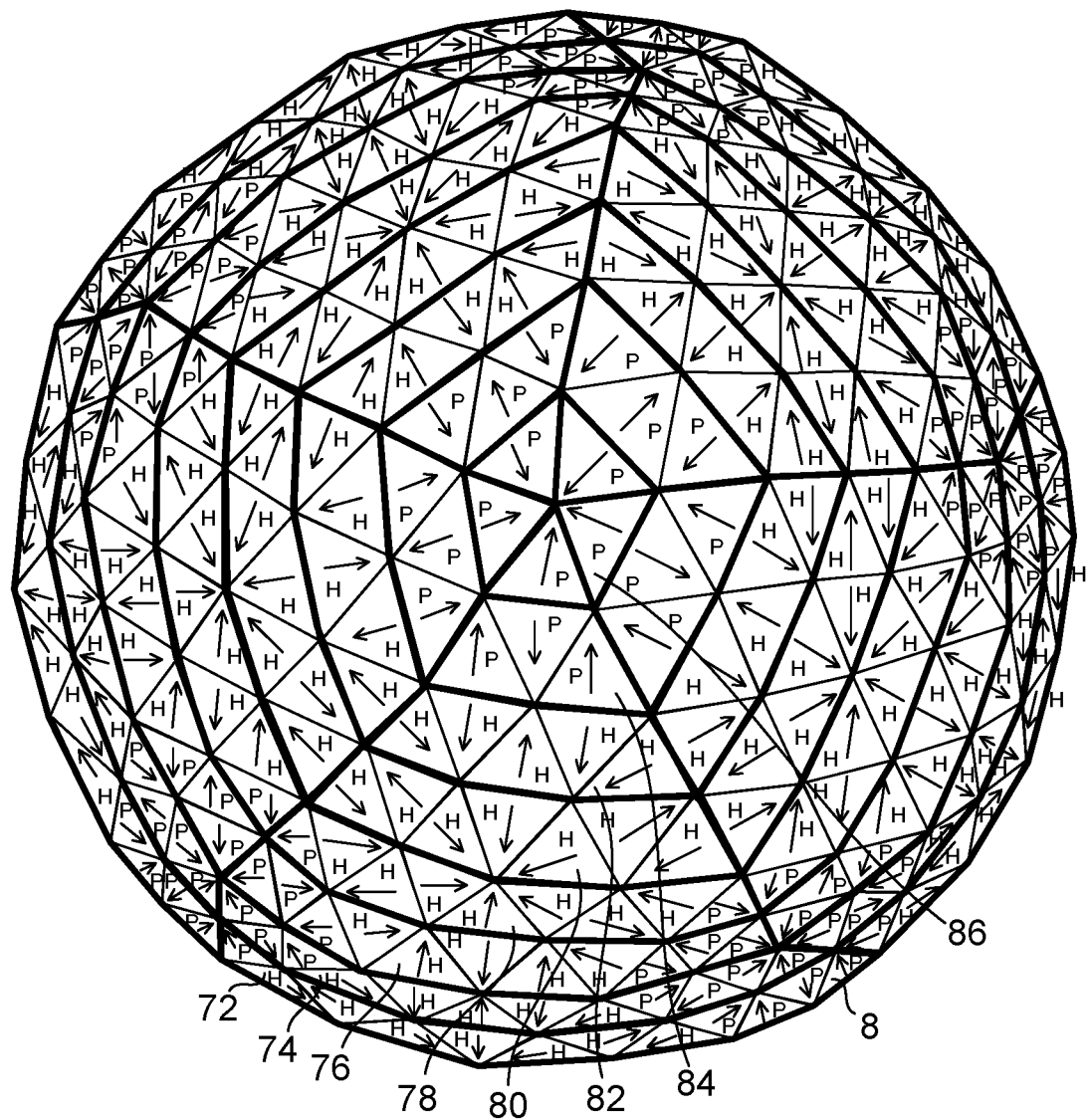
FIG. 8 depicts a second frequency dome constructed with pentagonal and hexagonal blocks.
Figure 8A:
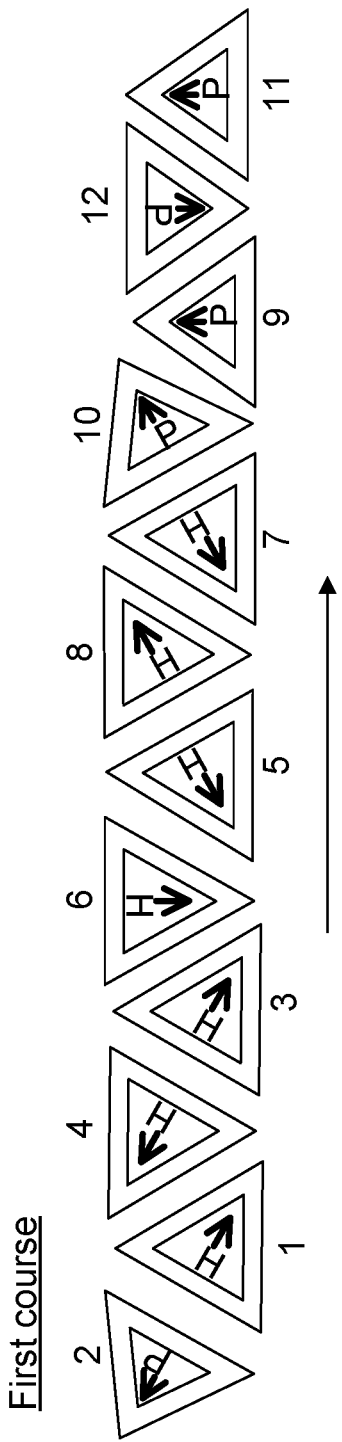
FIGS. 8A-8H depict arrangements of blocks in various courses of blocks used for constructing the dome of FIG. 8.
Figure 8B:
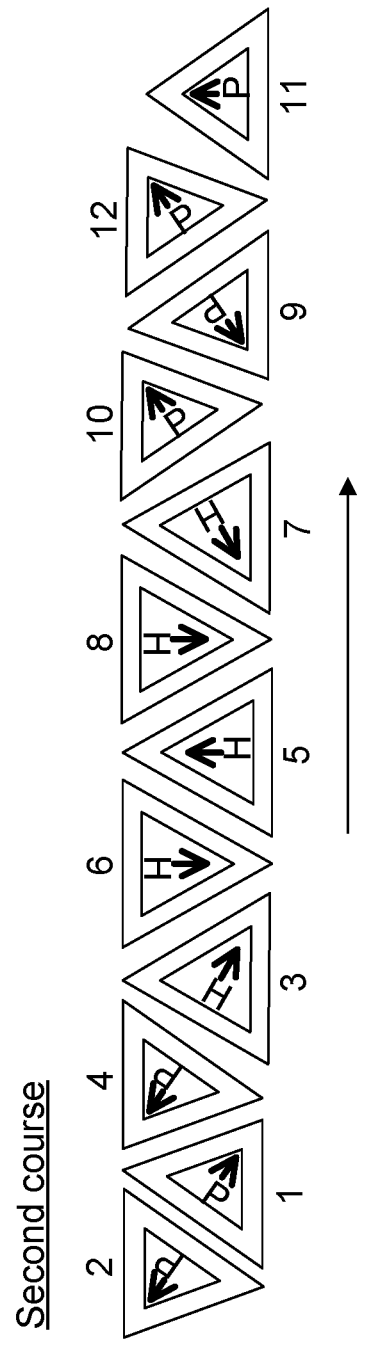
Figure 8C:
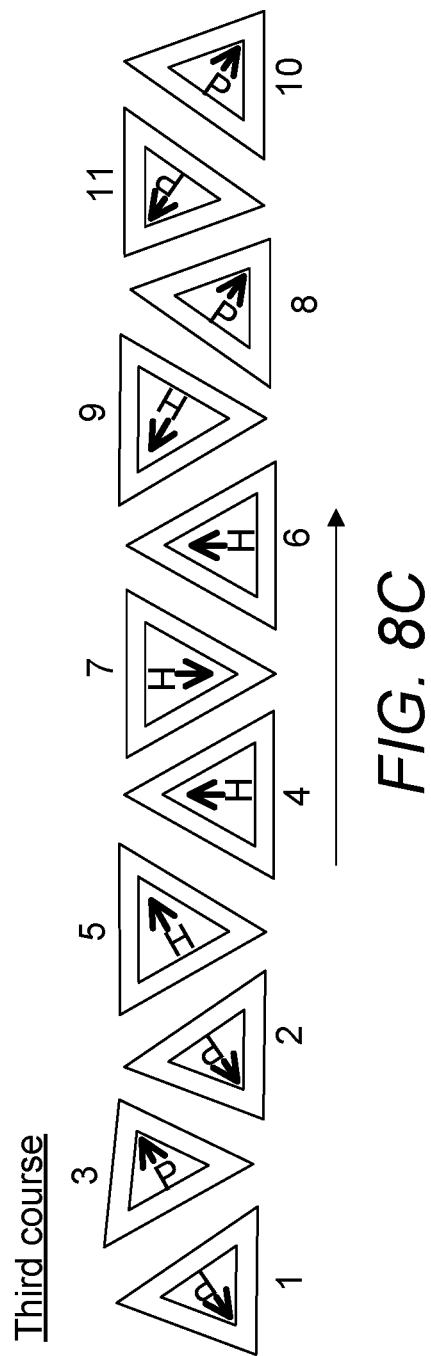
Figure 8D:
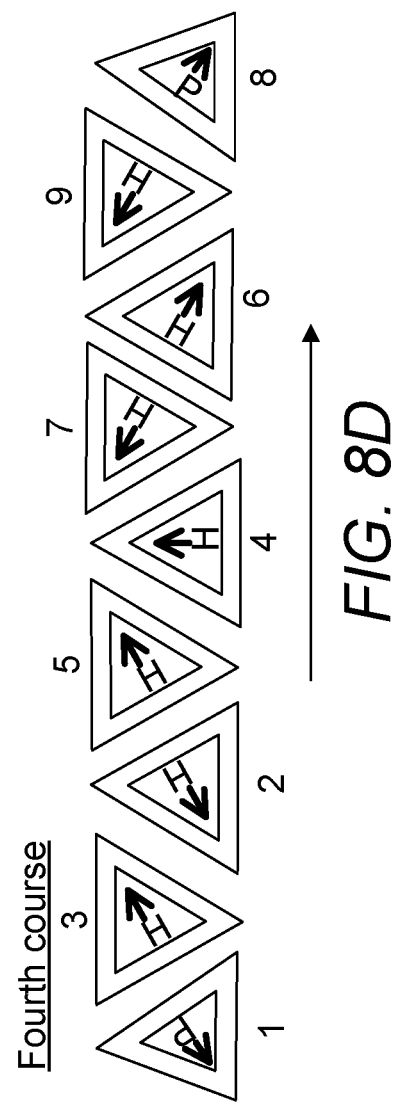
Figure 8E:
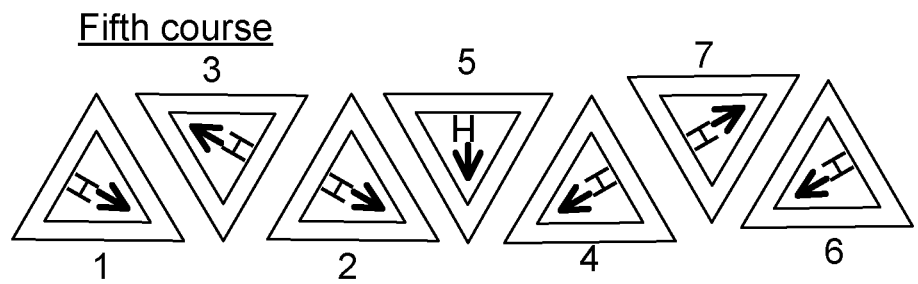
Figure 8F:
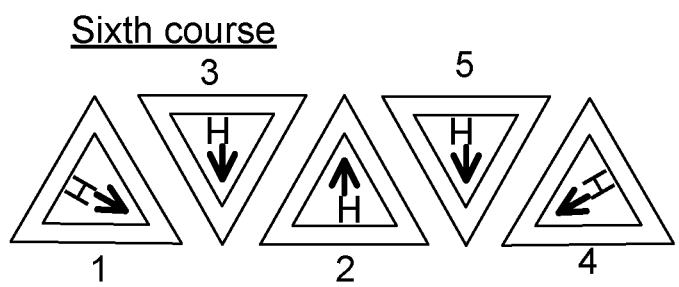
Figure 8G:
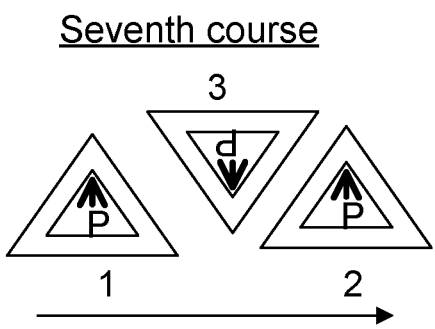
Figure 8H:
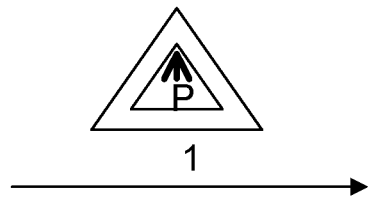
Figure 9:
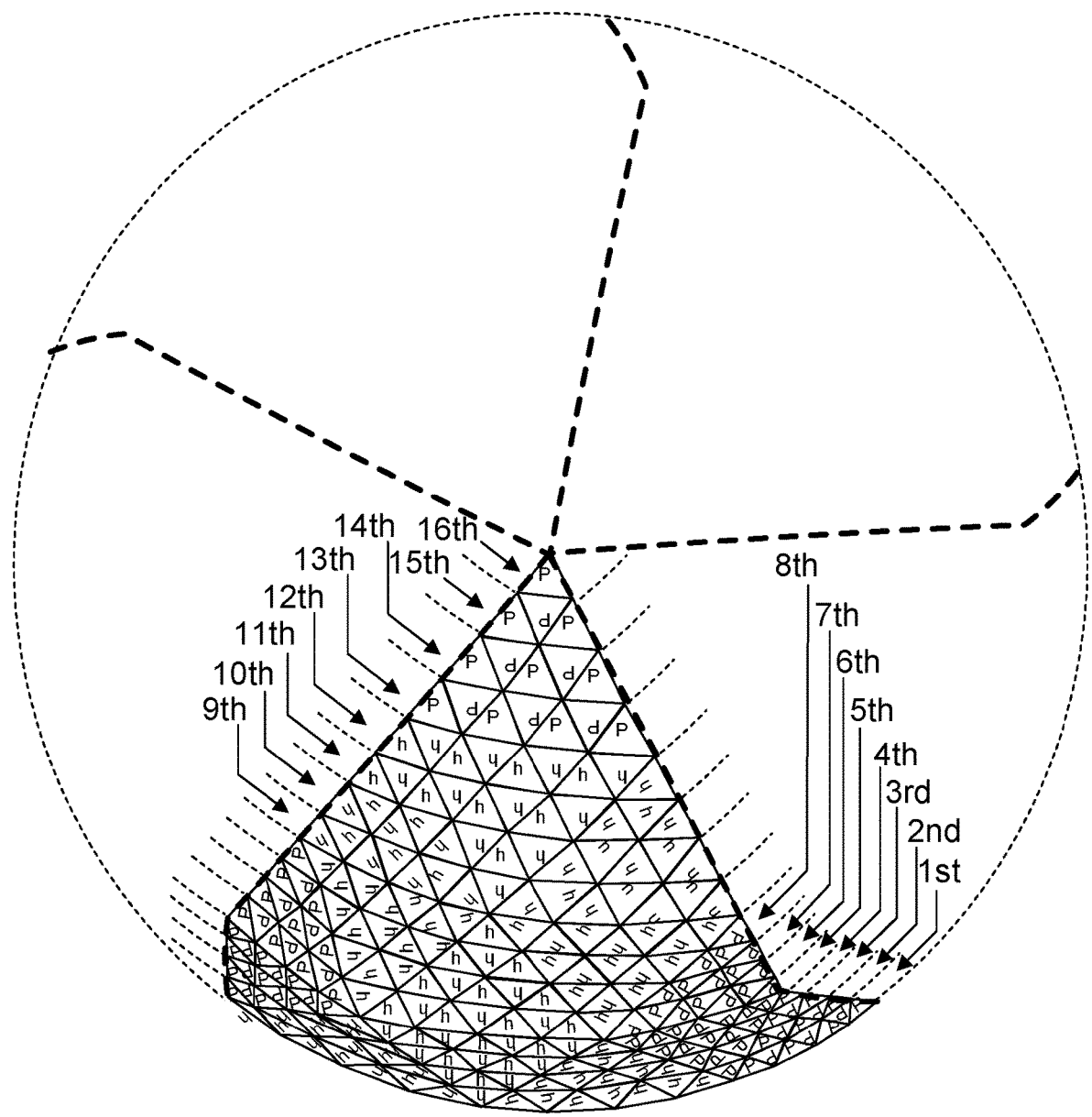
FIG. 9 depicts a third frequency dome constructed with pentagonal and hexagonal blocks.
Figure 9A:
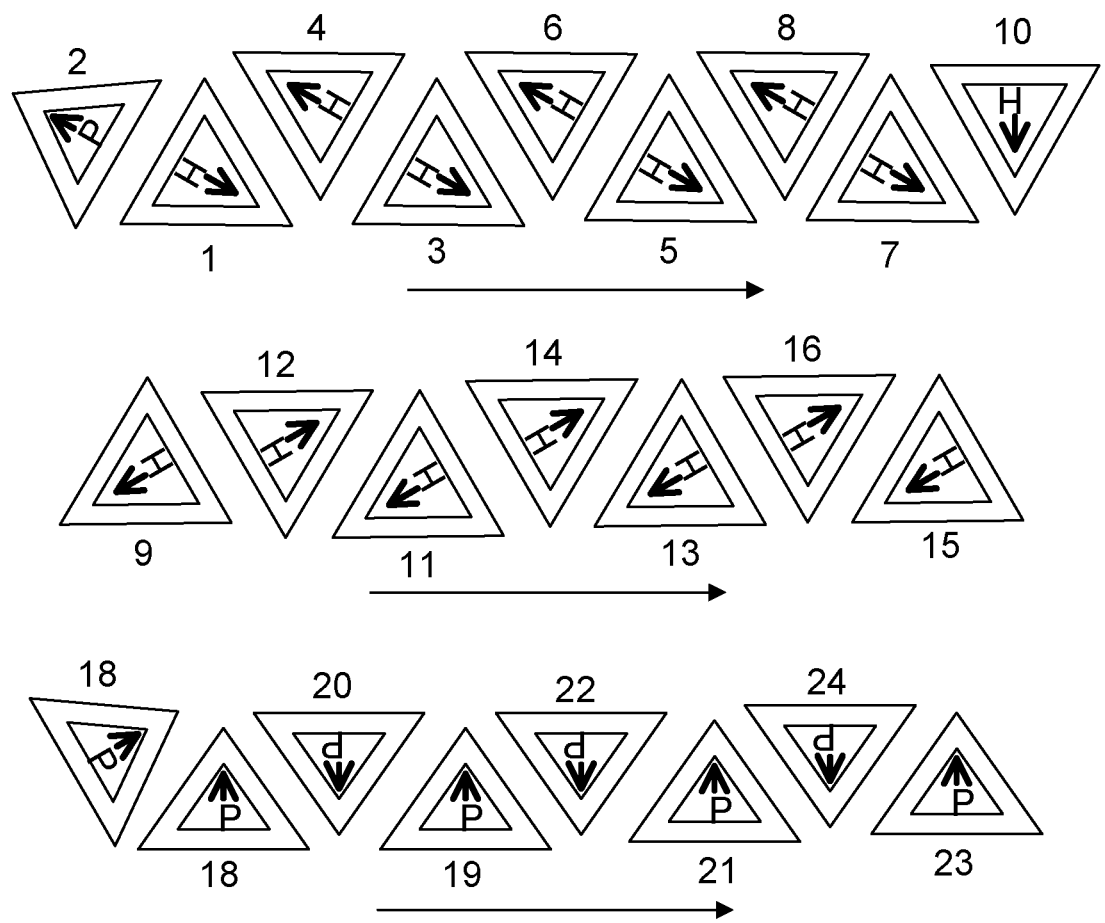
FIG. 9A depicts an arrangement of blocks in the first course of blocks used for constructing the dome of FIG. 9.

FIG. 8 depicts a second frequency dome constructed with pentagonal and hexagonal blocks. Here, there are eight courses 72, 74, 76, 78, 80, 82, 84 and 86. FIGS. 8A-8H depict arrangements of blocks in various courses of blocks used for constructing the dome of FIG. 8. Here, both the first and the second courses each includes twelve blocks for each unique group. Again, note that in order to complete a course, a unique group for the course must be completed a total of five times. The two courses include two different sets of blocks as shown in FIGS. 8A and 8B. FIGS. 8C, 8D, 8E, 8F, 8G and 8H depict block arrangements for the third through the eighth course. A second frequency truncated icosahedron constructed from the blocks according to Roberts 1 and Roberts 2 spans from about 14 to about 16 ft. FIG. 9 depicts a third frequency dome constructed with pentagonal and hexagonal blocks. Here, there is a total of 16 courses. Only one group is disclosed herein and the orientation of each block is represented only with the letters "h" and "P" themselves as there is not sufficient space to show arrows as well. FIG. 9A depicts an arrangement of blocks in the first course of blocks used for constructing the dome of FIG. 9 and only the details of one course, i.e., the first course are disclosed herein. A third frequency truncated icosahedron constructed from the blocks according to Roberts 1 and Roberts 2 spans from about 21 to about 24 ft. In one embodiment and referring to FIG. 19, the position of each block can be based on a spherical coordinate system where the dimensional center 88 of a block is specified by three numbers: the radial distance 90 of the dimensional center 88 of the block from the center 92 of the partial sphere or sphere, the polar angle 94 measured from a fixed zenith direction, and the azimuth angle 96 of the block's orthogonal projection on a reference plane that passes through the center of the partial sphere or sphere and is orthogonal to the zenith, measured from a fixed reference direction on that plane.

It can therefore be summarized that, in forming a polyhedron, e.g., a partial sphere, sphere, dome or arch, a pattern for each of a plurality of courses constituting the polyhedron is first determined based on the type of the polyhedron and the frequency of the polyhedron. A unique group is then determined from each of the plurality of courses. Then members of the unique group and orientation of each member of the unique group from the plurality of objects are determined. Finally, these blocks are laid to form the polyhedron.

Figure 10:
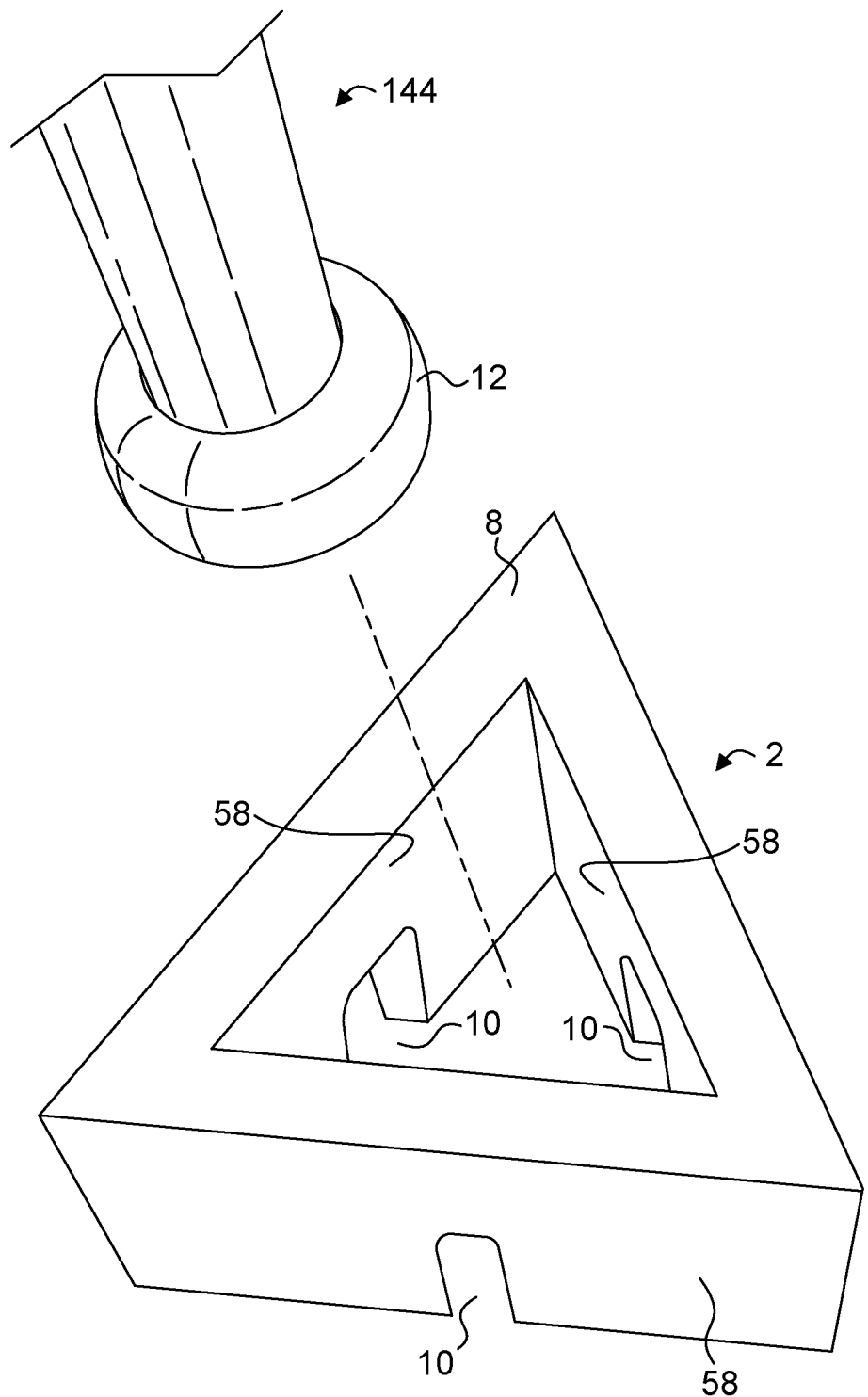
FIG. 10 is a diagram depicting a manipulator including an end effector configured for installing a block with other blocks to form a sphere, partial sphere, dome or arch.
Figure 10A:
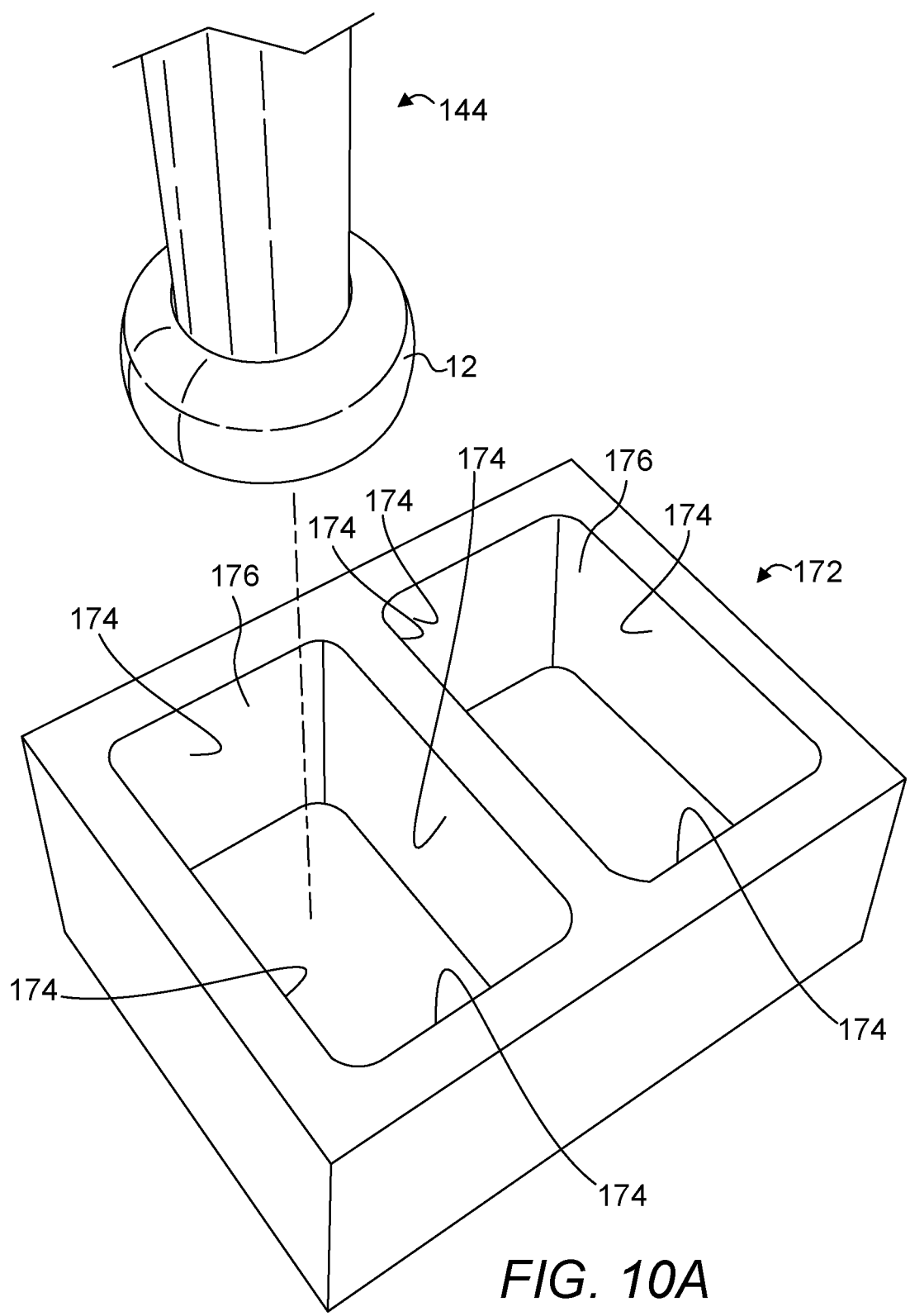
FIG. 10A is a diagram depicting a manipulator including an end effector configured for installing a block with other similar blocks to form, e.g., a flat wall.

The ensuing figures depict automated and/or semi-automated processes for laying blocks identified elsewhere herein. Like the manual process of laying rectangular bricks or blocks, a process for laying the blocks suitable for constructing a sphere, partial sphere, dome or arch can be time consuming and labor intensive. Further, the quality of manual block laying can be inconsistent as the skills of the block layers are directly related to the quality of structures built with the blocks. Yet further, mistakes may be made by block layers. An automated or semi-automated process reduces these uncertainties. FIG. 10 is a diagram depicting a manipulator 144 including an end effector configured for installing a block 2 with other blocks 2 to form a sphere, partial sphere, dome or arch. FIG. 10A is a diagram depicting a manipulator including an end effector configured for installing a block with other similar blocks to form, e.g., a flat wall. FIG. 10B is a diagram depicting a manner in which a rectangular block may be picked up. FIG. 10C is a diagram depicting a manipulator including an end effector configured for installing a block with other similar blocks to form, e.g., a post. FIGS. 11-14 represent a series of diagrams depicting one embodiment of a control system useful for controlling an end effector 12 for moving blocks in the process of installing such blocks to form a sphere, partial sphere, dome or arch. It is possible to grasp a side wall of the block 2 as at least one of the side walls 58 is not applied any mortar. However, preferably, no consideration needs to be given to the side wall that can be grasped without affecting the mortar to be applied to one or two side walls. The end effector is preferably side wall agnostic to avoid both the complication of having to determine which side wall to grasp and also the imbalance in weight distribution as experience in the end effector if only one side wall of a block is grasped in moving the block. Further, the end effector must clear the areas around of the channels so as not to interfere with block laying. Shown herein is an end effector that is a bladder 14 operably connected to a directional control valve 26 that is a three-position valve. The end effector may be controlled using valves or other configurations as long as the bladder 14 can be controlled to assume two different sizes, a larger diameter configuration to engage a block 2 and a smaller diameter configuration to the release the block. The bladder 14 is mounted on the tip of a cylinder 102 rotatable about a rotational joint 38 with respect to cylinder 104. This rotation, controlled by rotation mechanism 18, allows a block 2 that has been picked up to be orientated in a manner consistent to the requirements for the block to be laid as disclosed elsewhere herein. The bladder 14 is essentially a flexible-sized or resilient device shaped in the form of a donut where its volume can change based on the pressure of the fluid disposed therein. In one embodiment not shown, the bladder 14 is shaped in the form of a sphere. Essentially, in a relaxed state, the bladder 14 assumes a hardness that is less than the hardness of bladder 14 in its inflated state. Also, in the relaxed state, the bladder 14 is smaller in size than the bladder 14 in its erected state or inflated state (if a gas, air or pneumatic is used). A suitable pressure in the hydraulic fluid disposed therein erects the donut to a size suitable for engaging the block 2 at its core 170 with a sufficient amount of grip. This grip shall be secure and shall be disposed at a level sufficiently lower than the tensile strength of the block. Upon relieving the donut of the high pressure, the donut returns to its depressurized size such that it can clear the walls 58 of the block 2. In one embodiment, the bladder is constructed from rubber or another resilient but otherwise impervious material. In one embodiment, the bladder is reinforced, e.g., with steel or polymeric belts, chains, plates to increase the service life span of the bladder and also to more favorably shape the bladder both when it is erected or retracted. In the embodiment shown, there are further provided treads 16 that assist in engagement of the block 2 by its core 170. Although the bladder 14 may be controlled directly by a fluid conductor connected to it externally, the internal communication of the hydraulic fluid between cylinder 102 and cylinder 104 allows cylinder 102 to make complete revolutions with respect to cylinder 104 for mortar application and also block laying without consideration of rotary motions limited by a fluid conductor connected to the bladder 14. In other words, cylinder 102 is capable of continuously rotating with respect to cylinder 104. In making rotational adjustments, cylinder 102 does not need to be driven in both directions as cylinder 102 is configured for complete rotations against cylinder 104. In one embodiment, the rotational joint 38 is driven by a motor 20 having a pinion 22 coupled to a rack 24 mounted to cylinder 102. Cylinder 104 is in turn mounted to another joint, i.e., joint 40, that is further supported by one or more joints that facilitates the movement of the end effector 12. Here, joint 40 is supported by an arm 44 and rotation of cylinder 104 about joint 40 is effected by an actuator 42, e.g., a hydraulic cylinder. Cylinder 102 includes an internally-disposed conduit or conductor connecting the bladder 14 mounted on the tip of cylinder 102 and the reservoir in cylinder 104. Two fluid conductors 36 connect the reservoir of cylinder 104 to the three-position valve 26. A pump 34, e.g., a positive replacement pump, is fluidly connected, at one end, to a tank 106 which supplies a hydraulic fluid to be pressurized by the pump 34 and supplied to expand the bladder 14 or to receive the hydraulic fluid once the bladder is depressurized and at the other end, the three position valve 26. While not in use, the valve is disposed in either position 28 or 30. In position 30, all flows are blocked. Therefore, in position 30, the last state of the end effector 12 is retained in position 30. As such, this position is useful for allowing a load to be held at the end effector 12 even when the pump 34 no longer operates. In position 28, no pressurized fluid is supplied to the bladder 14 as a return path is available for pressurized fluid to be returned to the tank 106, allowing the bladder 14 to return to its unpressurized size such that it can be inserted into the core 170 of a block before being expanded to engage the block. In position 32, a fluid pressurized by pump 34 is allowed to flow into bladder 14 expanding it to a point sufficient to engage and lift a block 2 while not exceeding a threshold sufficient to affect the integrity of the block 2 by exerting expansive forces on the block from within the core 170 of the block. Although FIGS. 11-14 discloses a hydraulic system, a similar setup for an air system may also be used. If air is used, a compressor will be used in place of pump 34 and the fluid medium used will preferably be air. Referring back to FIG. 10A, it shall be noted that the block 172 is a rectangular block with two cores 176 each rectangularly-shaped. In picking up the block 172, the end effector 12 is operated in much the same manner as the end effector 12 shown in FIG. 10. Here, the end effector 12 is configured to pick up the block 172 by contacting the walls 174 of only one of the two cores 176. Referring back to FIG. 10B, it shall be noted that in this example, as the cross-sectional profile of each core 176 approximates a rectangle, the generally round cross-sectional profile of the end effector 12 enables contact of the end effector 12 with the block 172 at minimum on two opposing areas each located on a wall 174. Referring back to FIG. 10B, it shall be noted that the block 178 is a cylindrical block with a cylindrically-shaped core 182. Again, in picking up the block 178, the end effector 12 is operated in much the same manner as the end effector 12 shown in FIG. 10. Here, the end effector 12 is configured to pick up the block 178 by contacting the wall 180 of the core 182. Here, the end effector 12 contacts the block 178 roughly about its diametric periphery as a cross-sectional profile of the end effector 12 approximates the shape of the cross-sectional profile of the core 182.

Figure 12:
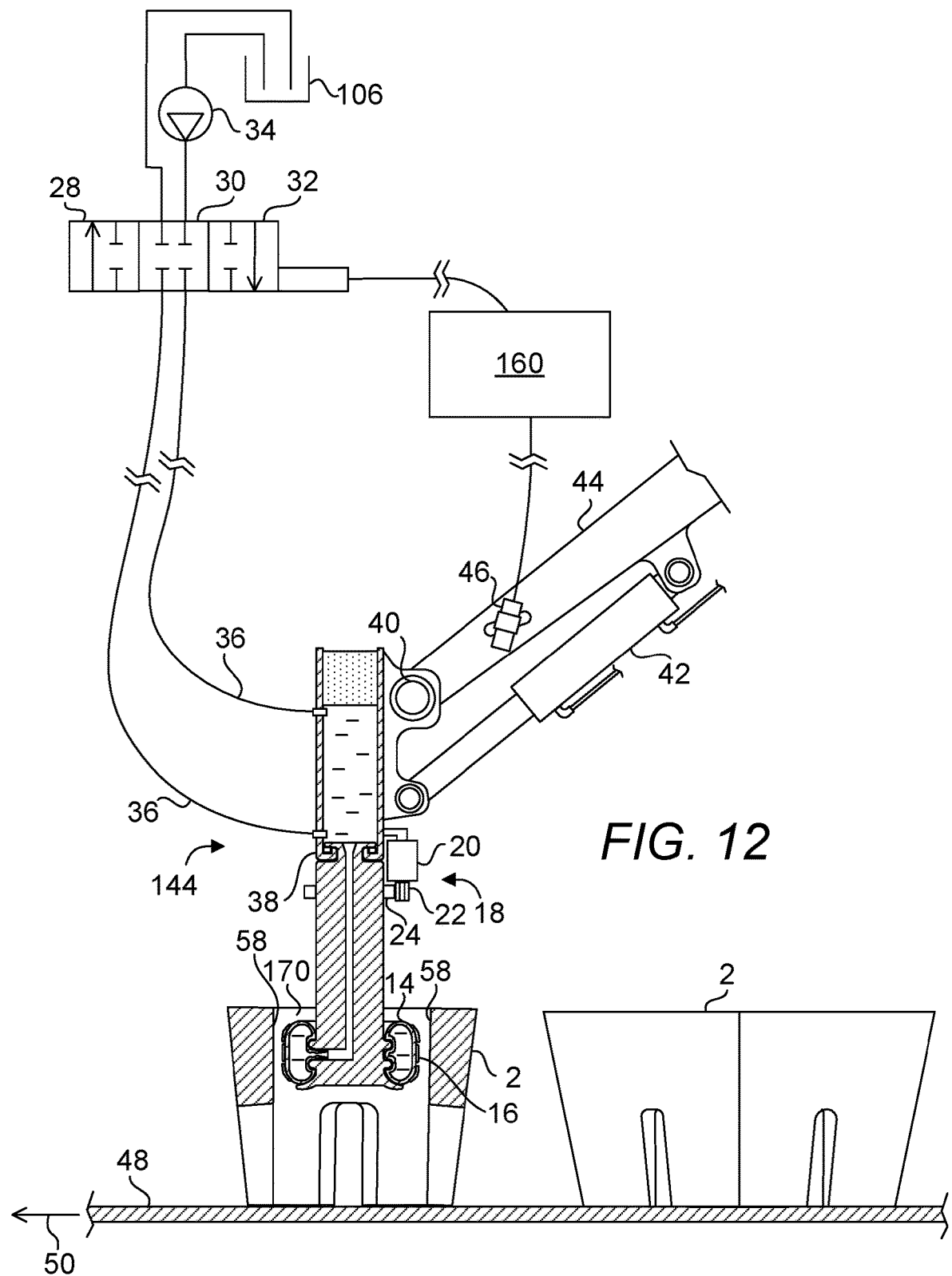
Figure 13:
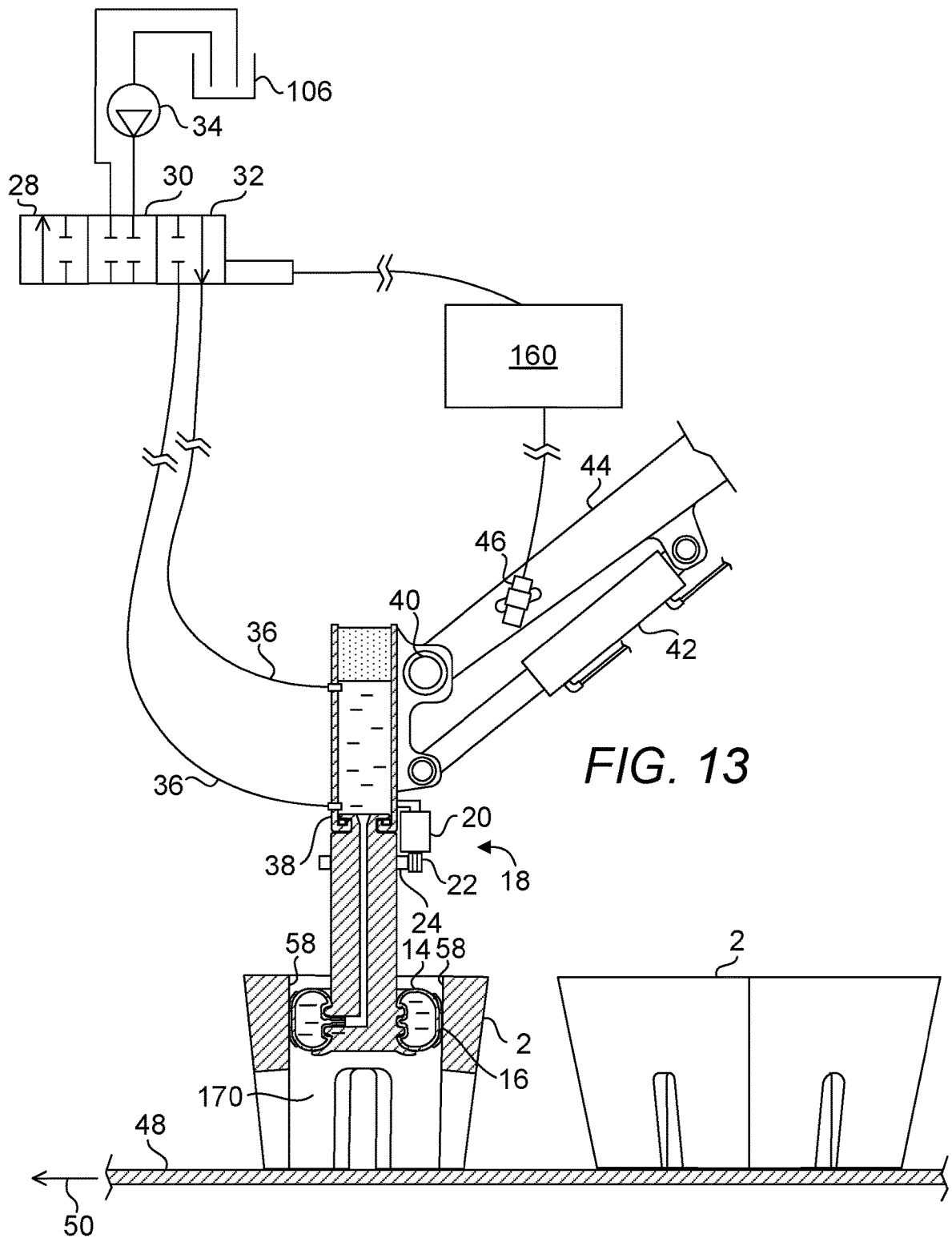
Figure 14:
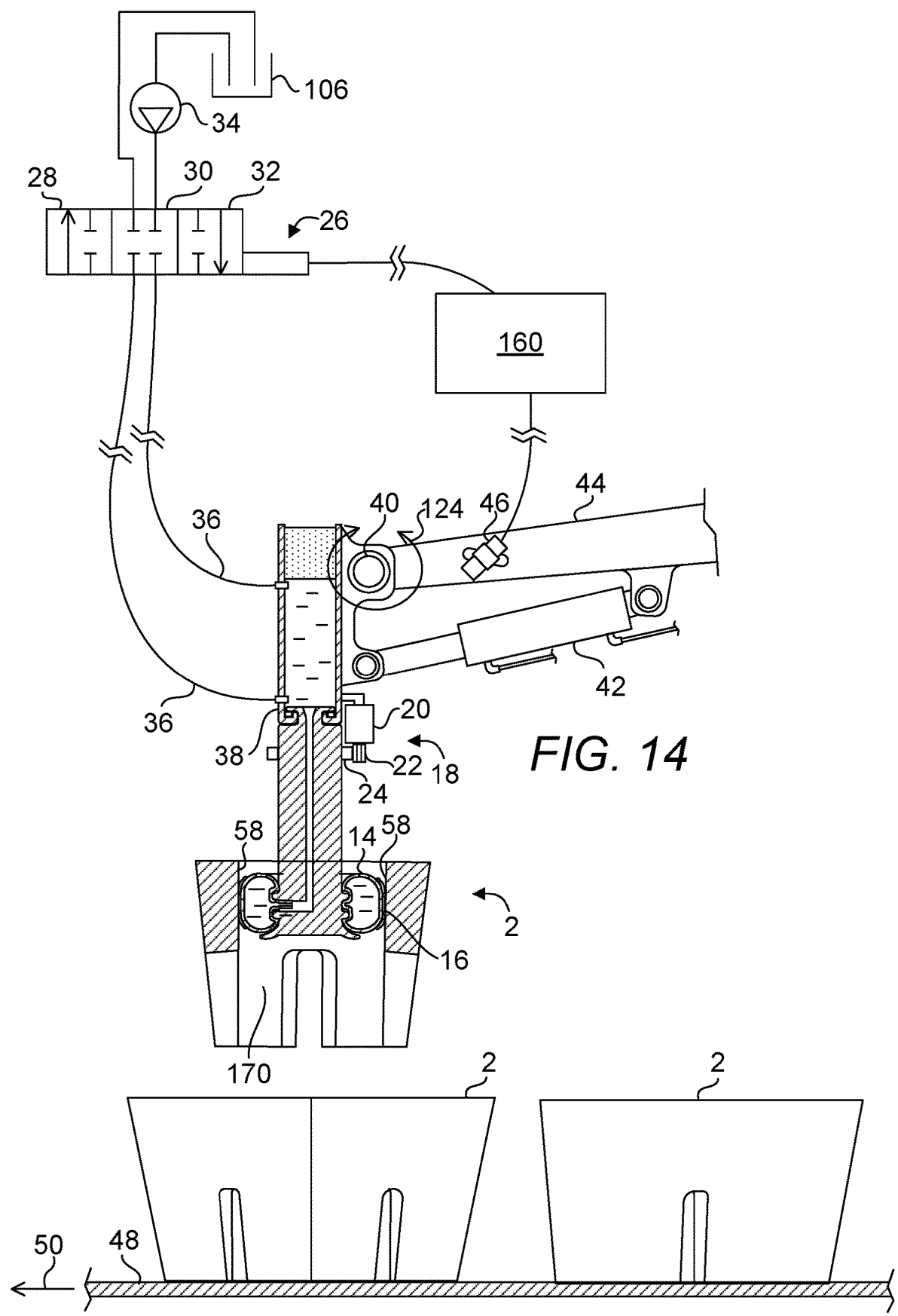

It can be seen in FIG. 14 that the end effector 12 is disposed in a position ready for the end effector 12 to be inserted into the core 170 of a block 2 disposed on a conveyor 48 capable of moving in direction 50 to replenish blocks 2 to be picked up to get one or more beds of mortar applied to it and subsequently laid. In one embodiment, the localization of blocks and path or trajectory planning of the end effector trajectories is aided by a vision system enabled by a camera 46. The camera 46 and three position valve 26 are operably connected to a controller 160. Although there are many devices that are operably connected to the controller 160, only devices relevant to the discussions herein are shown connected to the controller 160. Coarse guidance, e.g., guidance of the end effector 12 within, e.g., 5 to 10 ft of the target is performed based on one of or a combination of the Global Positioning System (GPS), dead-reckoning and other well-known localization techniques. However, beyond this coarse guidance, the end-effector is guided by a vision system capable of detecting a block, the shape of a block, the shape of a block which leads to the determination of whether the block is a pentagonal or a hexagonal block, the location of the block, the orientation of the block and the target location for a block to be laid, etc. Referring back to FIG. 14, before the end effector 12 can pick up a block, the vision system must resolve the location of the block 2 such that the end effector 12 can be placed appropriately to pick up the block 2. The blocks 2 are preferably disposed in a manner such that the end effector 12 can approach from the top of a block 2 to pick up the block 2. The orientation of the block 2 to be picked up may be determined at this time or just prior to when the block 2 is applied mortar, for construction which requires mortar or simply placed, if no mortar is required. FIG. 12 depicts the end effector 12 having been placed inside the core of a block 2, ready for the bladder 14 to be expanded to engage the block 2. FIG. 13 depicts the end effector 12 having been expanded inside the core of a block to engage the block. FIG. 14 depicts the end effector 12 having been used to pick up a block 2 that will be laid before returning to the same general vicinity to pick up the next block 2 that has now been moved into position by the conveyor 48 to be picked up. A conveyor may be configured to run alongside a support structure that supports the arm 44 or it may be made available separately as the one shown in FIG. 21.

Figure 15:
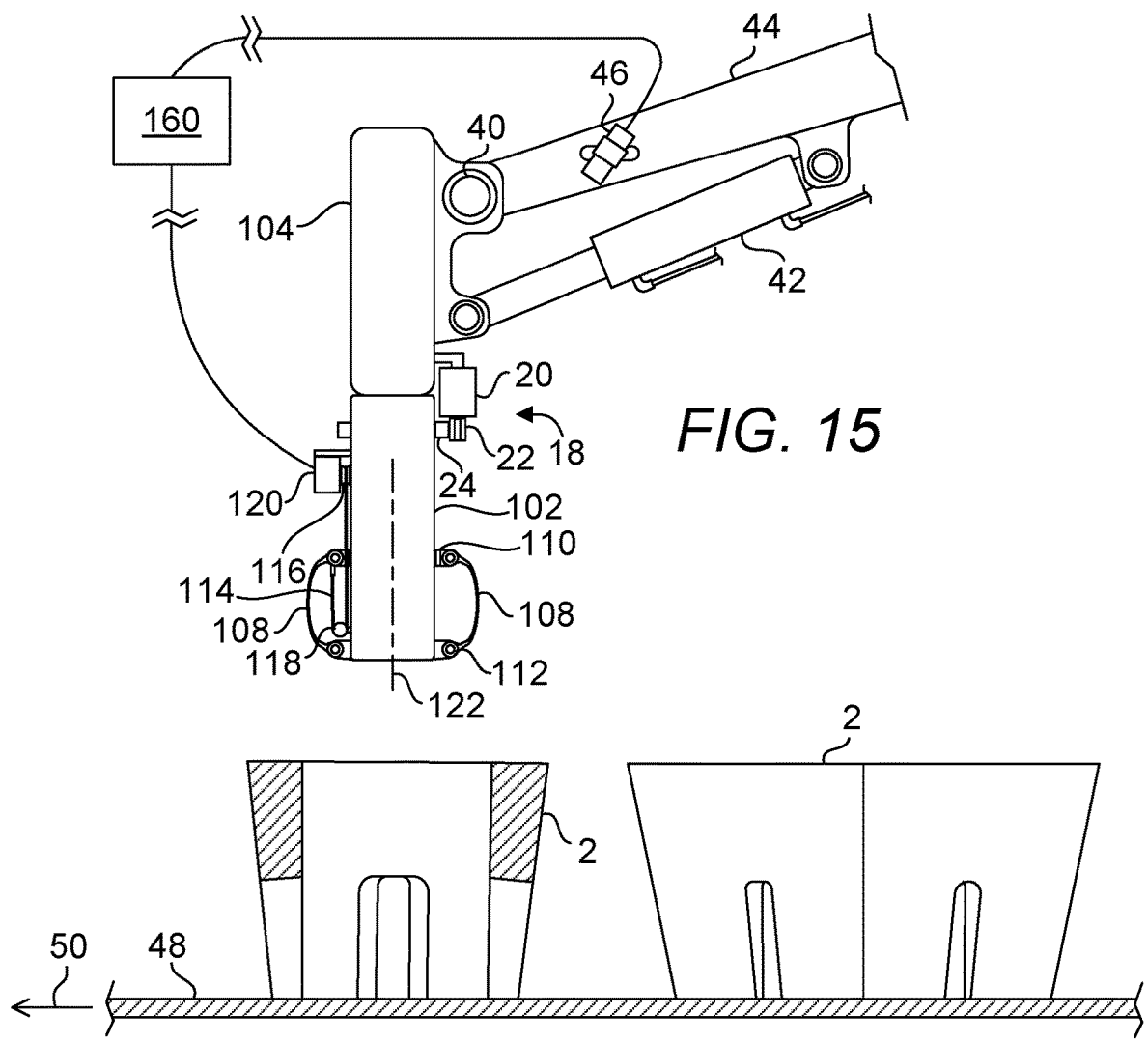
FIG. 15 is a diagram depicting another embodiment of a control system useful for controlling an end effector for moving blocks in the process of installing such blocks to form a sphere, partial sphere, dome or arch.
Figure 16:
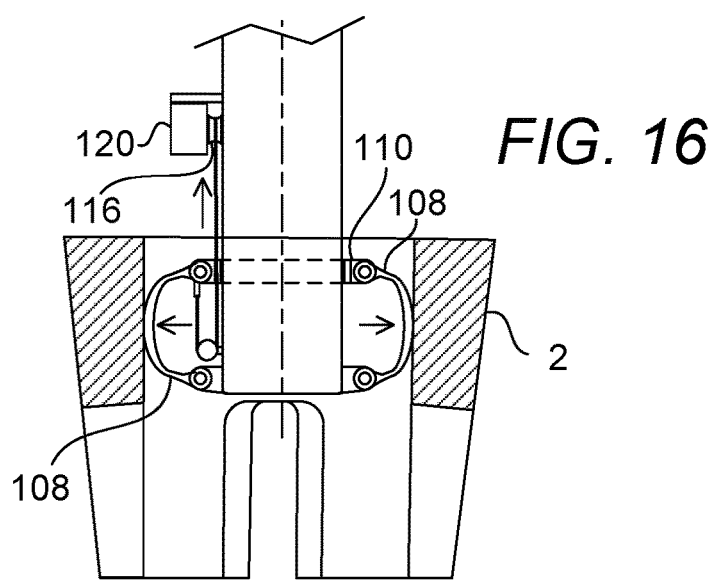
FIG. 16 is a close-up diagram of the end effector shown in FIG. 15, depicting the engagement of the end effector with a block.

FIG. 15 is a diagram depicting another embodiment of a control system useful for controlling an end effector for moving blocks in the process of installing such blocks to form a sphere, partial sphere, dome or arch. FIG. 16 is a close-up diagram of the end effector shown in FIG. 15, depicting the engagement of the end effector with a block. The end effector shown in FIGS. 15-16 also functions based on the resilience afforded by a change in overall size of the end effector. However, the change is size is effected by a plurality of leaf springs 108. It shall be noted that only two leaf springs 108 are shown in FIG. 15. A plurality of leaf springs, e.g., from about fifteen to twenty, are disposed about the central axis 122 of cylinder 102. Each leaf spring 108 is attached at one end, to an upper ring 110 and at the other end, to a lower ring 112 that is attached to at the bottom end of cylinder 102. Upper ring 110 is configured to be slidable along cylinder 102. In the embodiment shown, upper ring 110 is connected to a string 114 routed via a pulley 118 to a drive pulley 116 that is powered by a motor 120. As the string is shortened when it is taken up by the drive pulley 116, the upper ring 110 is pulled against the lower ring 112, compressing and making the leaf springs "bulge" as shown in FIG. 16, increasing the hardness and size of the end effector as a whole to engage the block 2 within the core of the block 2. As the string 114 is relaxed, the leaf springs 108 return to their unstressed or lower-stressed condition and the bulge no longer exists, decreasing the hardness and size of the end effector.

FIG. 17 is a diagram depicting one embodiment of an end effector useful for moving panels 4 in the process of installing such panels to form a sphere, partial sphere, dome or arch. Here, instead of picking up blocks to be laid, panels 4 are assembled instead. Note that in a panel 4, no core is available and this precludes the possibility for the panels to be picked up in the same manner as the blocks. Therefore, for picking up panels or coreless blocks, a different mechanism which does not require that blocks to be cored, must be made available. In this embodiment, a vacuum mechanism is used. The end effector is equipped with a suction cup 54 connected to a vacuum generator. In picking up a panel 4, the arm 44 is positioned such that the end effector comes in contact with a top surface of the panel 4 such that vacuum can be formed in the suction cup 54 and the panel 4 can be picked up. In releasing the panel 4, vacuum is removed such that the panel 4 is no longer held by the suction cup 54.

FIG. 18 is a diagram depicting a manner in which mortar is applied to a block 2. In this embodiment, mortar 98 is applied to a block 2 about to be laid. The block 2 has been previously picked up using a manipulator having an end effector including a bladder 14, is brought to the dispenser with the side wall that is to be "buttered" with mortar 98 facing a nozzle of the dispenser 100. The contents of dispenser 100 are being emptied, by advancing a piston, onto a side wall to be "buttered" while the block 2 is being moved in a direction concurrently so that a bed of mortar 98 is fully applied to the side wall. Other binders, e.g., glue and adhesives, etc., may be used in place of mortar, provided that the binders have the consistencies similar to mortar to allow the binder to adhere properly to the side wall upon its application to the side wall and also after the block has been laid. In another embodiment, mortar 98 may be sprayed onto the side wall. In yet another embodiment, mortar 98 may be sprayed onto a laid block instead of a block to which mortar is to be applied.

Figure 19:
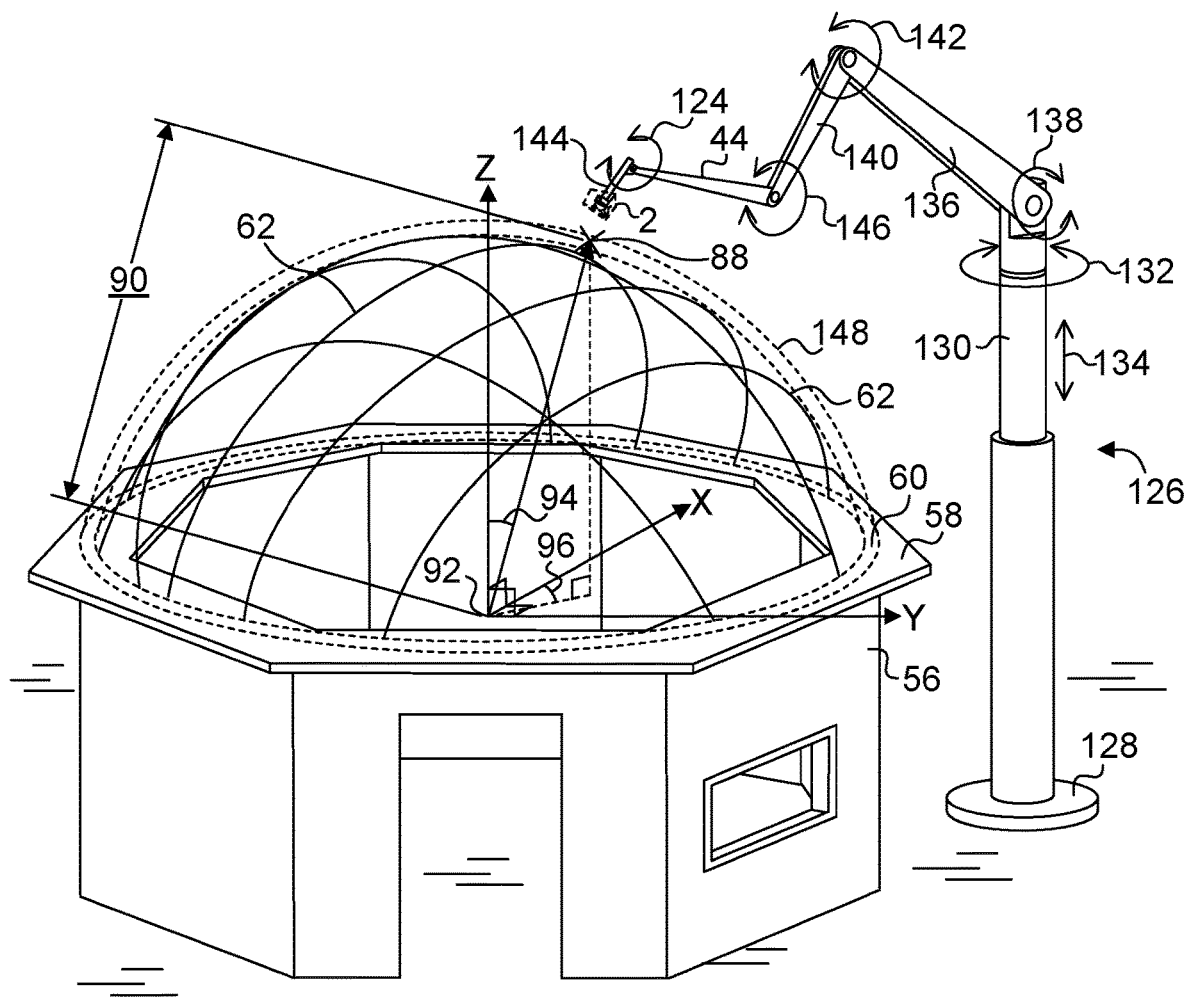
FIG. 19 is a diagram depicting a structure with walls atop which a roof is to be disposed.
Figure 20:
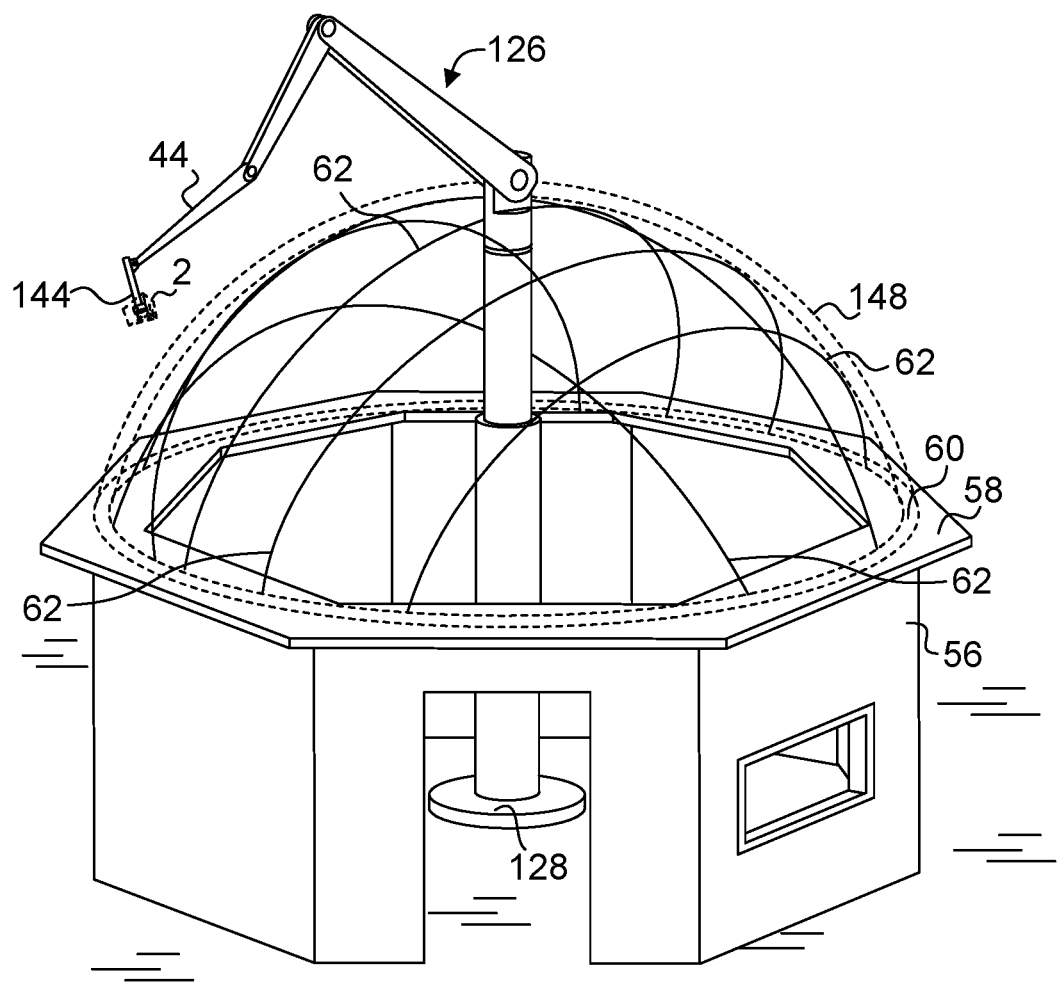
FIG. 20 is a diagram depicting a structure with walls atop which a roof is to be disposed.

FIG. 19 is a diagram depicting a structure with walls atop which a roof is to be disposed where a construction robot 126 is disposed outside of the confines of a structure to be built. FIG. 20 is a diagram depicting a structure with walls atop which a roof 148 is to be disposed where a construction robot 126 is disposed within the confines of a structure to be built. In one embodiment, in forming a sphere, rebars 62 only need to be arranged in great circle arcs to create a rebar framework before the present blocks can be coupled and laid onto the rebar framework starting from a base 60. Disclosed herein is a construction robot 126 that can be moved to and set up at a construction site. The construction robot 126 itself can have a mobility platform and/or a stability platform which assists in getting the construction robot 126 to work site and setting a stable base from which the robot 126 is based. Alternatively, the robot 126 may be truck-mounted for applications accessible by trucks or vehicles. In the embodiment shown, the robot 126 includes a base 128 upon which the arm 44 is based. Arm 44 is supported and location-controlled with linkages which together allow multiple degrees of freedom. Trunk 130 is configured to rotate in directions 132 about the base 128 and extend/retract in directions 134 with respect to the base 128 and helps align the plane in which the end effector is to be disposed with the target. Arm 136 that is configured for rotation 138 about a joint at the tip of trunk 130 within this plane and arm 140 that is configured for rotation 142 about a joint at the tip of arm 136, also within this plane, all allow arm 44 to be placed at a location suitable for the manipulator 144 to lay blocks. Arm 44 is configured for rotation 146 about a joint at the tip of arm 140 within this plane. In laying a block 2, at least one of the joints is required to be actuated to pick up the block 2, apply a bed of mortar to it and lay it. Robots with other configurations of linkages are possible as long as the end effector can be used to pick up and lay blocks with the most economical means desired. The amount of movements of the base or linkages close to it can be minimized by moving the components contributing to the dexterity and skills of the robot as close to the end effector as possible. Referring to FIG. 20, a vertical space within the walls 56 of the structure whose roof 148 is being built must be made available to ensure that required motions of robot 126 are not restricted. Benefits of placing the robot 126 within the walls allow the robot 126 to reach all parts of the roof within having to move the base 128 around the building while constructing it.

Figure 21:
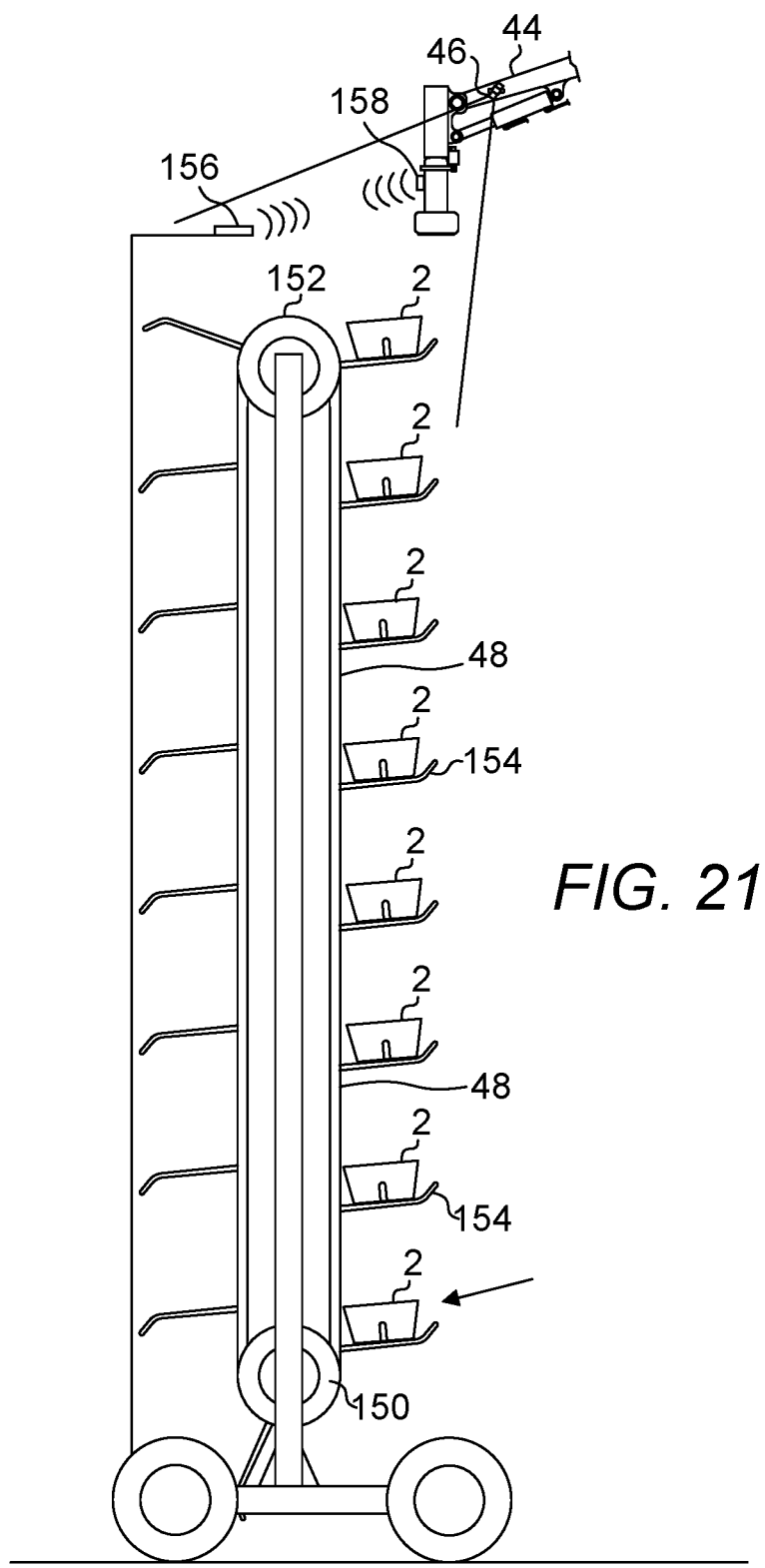
FIG. 21 is a diagram depicting one embodiment of a material supply system.

FIG. 21 is a diagram depicting one embodiment of a material supply system. Here, an independent conveyor 48 is provided to simplify material transfer. If blocks are transferred from the base 128 of the robot 126 to a location where the blocks are used alongside the linkages, the conveyor that much be provided will weigh significantly and the support system for conveyor will add significant complexity, weight and size to the total system. FIG. 21 discloses a system that can be moved to a location within an envelope of operation of the end effector to simplify and reduce the trajectories required for the end effector to pick up a block to be laid. The material supply system includes a frame on which a drive roller 150 is mounted at a lower end and an idler roller 152 is mounted at an opposite end of the frame. The conveyor 48 is disposed over these rollers 150, 152 and configured to revolve around them. A plurality of cradles 154 are mounted on the outside surface of the conveyor 48, each cradle 154 configured for carrying a block 2 to the top of the material supply system. The conveyor 48 is advanced only if the loaded cradle disposed at the top of the conveyor 48 has been cleared as the block 2 disposed in it has been picked up. In one embodiment, there is further provided a location engagement system used for increasing the confidence the end effector of a robot is approaching a target. In this case, a radio frequency identification (RFID) system may be used. Here, complementary RFID components 156, 158, e.g., an RFID reader-RFID tag pair, are each mounted on the material supply system and the manipulator to indicate the proximity of these two systems. In one embodiment, the vision system (via camera 46) used for determining the location and/or orientation of a block 2 to be picked up, is not given a task to detect a block 2 to be picked up until the RFID components 156, 158 have come into the envelope of influence of one another. In one embodiment, different types of blocks may be supplied on one conveyor and the responsibility of distinguishing the type of blocks would fall on the shoulders of the present system to pick up a block of the correct type. However, it is also possible to supply the same type of blocks to each conveyor. Therefore, there will be two conveyors for delivering two types of blocks, i.e., the pentagonal or hexagonal blocks. The availability of dedicated conveyors removes the need for the present vision system to first determine or confirm the type of a block before it is picked up to be laid.

Figure 22:
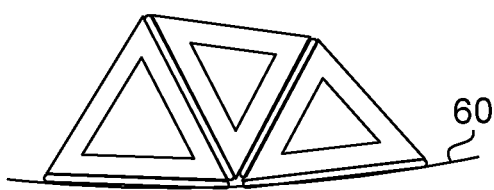
FIGS. 22-22G represent a series of diagrams useful for describing the manner in which blocks are laid with the aid of a vision system.
Figure 22D:
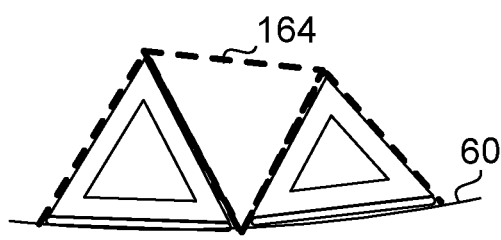
Figure 22A:
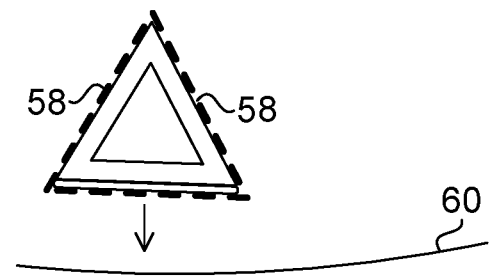
Figure 22E:
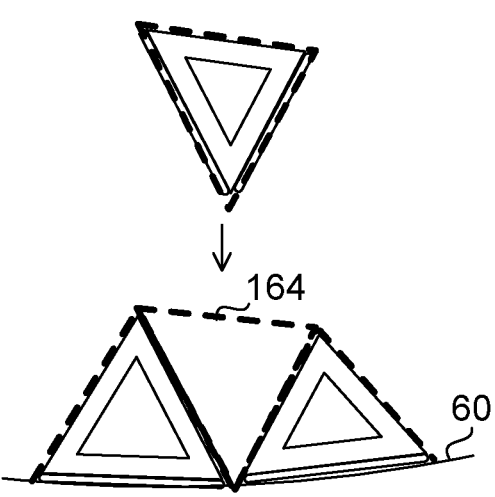
Figure 22B:
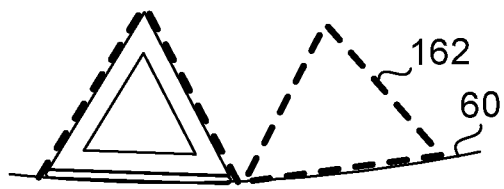
Figure 22F:
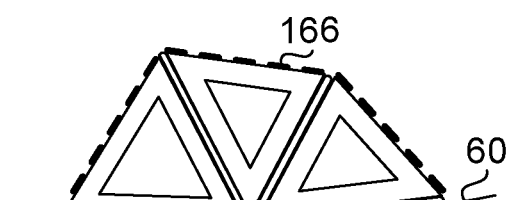
Figure 22C:
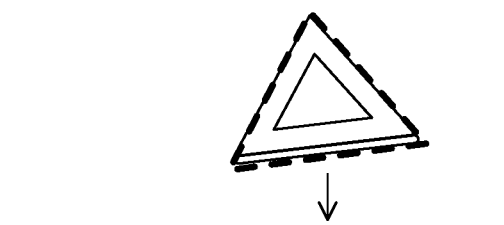
Figure 22G:
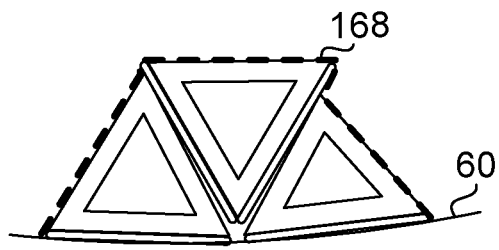

FIGS. 22-22G represent a series of diagrams useful for describing the manner in which blocks are laid with the aid of a vision system. FIG. 22 shows a group of three blocks that have been assembled. FIGS. 22A-22G represent a series of diagrams useful for showing how the present vision system aids in locating blocks to be laid and how the laid group of blocks can be verified. FIG. 22A shows a surface 60 upon which a block is to be laid. Using image processing and feature detection techniques, a block is picked out from an image of the block. The thick dashed lines represent lines superimposed over one or more edges, boundaries, outlines or otherwise, features of one or more blocks as resolved by the vision system. In FIG. 22A, the thick dashed line represents the outline of a block. The vision system then resolves the type of block by detecting the side wall lengths and/or their ratios. Side walls 58 have been determined to have equal lengths and therefore the tip is determined to be the corner these side walls share. With this information, the orientation of the block can be determined and the manipulator handling this block can be controlled to dispose this block in a desired orientation. Here, the block is determined to be a hexagonal block. FIG. 22B shows that the block shown in FIG. 22A has been disposed on a surface. The position for the next block can now be resolved to be to the right of the block just laid. Outline 162 represents the position of the next block and the type of the next block has also been determined from the order of blocks to be laid. Here, the next block is a pentagonal block with its tip up. FIG. 22C shows that a pentagonal block orientated in a manner shown in outline 162 is being brought to location to be laid. FIG. 22D shows that the block destined to fill outline 162 has now been laid. The next block is now determined to be destined for outline 164. FIG. 22E shows a block being orientated in the manner similar to outline 164 is now being brought in to be laid. FIG. 22F shows that all three blocks have been laid. Note that the last block to be laid is a pentagonal block disposed with its tip pointed upwardly to the right. However, if the last block had been incorrectly installed, the outline of the three-block group, i.e., outline 168, would have been different than the outline of the properly laid group of blocks, i.e., outline 166. Therefore, the present vision system can be used to aid in block laying and to verify that a block has been properly laid.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A manipulator configured for transferring a block having at least one core, said manipulator comprises:
an end effector comprising:
(i) an elongated member comprising a tip; and
(ii) a resilient member configured for assuming a first state in which said resilient member has a first hardness and a first size and a second state in which said resilient member is configured for assuming a second state in which said resilient member has a second hardness and second size, wherein said first hardness is not the same as said second hardness and said first size is not the same as said second size and said resilient member is disposed on said tip, wherein said resilient member comprises a bladder, wherein said bladder comprises treads disposed on an outside surface of said bladder to enhance engagement of said resilient member of the at least one core,
wherein said elongated member is configured to be disposed such that said tip is disposed within the at least one core and said resilient member is disposed in said first state before said resilient member is disposed in said second state to engage the at least one core and said elongated member is moved to transfer the block.

2. The manipulator of claim 1, further comprising a second member, wherein said elongated member further comprises a second end opposingly disposed from said tip on said elongated member, said elongated member is rotatably connected to said second member such that the orientation of the block engaged by said end effector can be adjusted.

3. The manipulator of claim 1, wherein said end effector is controlled by a system selected from the group consisting of a hydraulic system and a pneumatic system.

4. The manipulator of claim 1, wherein said end effector is controlled by a system comprising a three-position valve.

5. The manipulator of claim 1, wherein the block is supplied by a material supply system that is not physically connected to said manipulator.

6. The manipulator of claim 1, wherein the block is a block selected from the group consisting of a triangular block, a rectangular block and a cylindrical block.

* * * * *